United States Patent
Kodaypak et al.

(10) Patent No.: US 11,968,561 B2
(45) Date of Patent: Apr. 23, 2024

(54) DYNAMIC SERVICE AWARE BANDWIDTH REPORTING AND MESSAGING FOR MOBILITY LOW LATENCY TRANSPORT

(71) Applicant: Radisys Corporation, Hillsboro, OR (US)

(72) Inventors: Rajendra Prasad Kodaypak, Hillsboro, OR (US); Prakash Sivasubramanian, Tigard, OR (US)

(73) Assignee: Radisys Corporation, Hillsboro, OR (US)

( * ) Notice: Subject to any disclaimer, the term of this patent is extended or adjusted under 35 U.S.C. 154(b) by 0 days.

(21) Appl. No.: 18/259,565

(22) PCT Filed: Jan. 10, 2023

(86) PCT No.: PCT/US2023/060423
§ 371 (c)(1),
(2) Date: Jul. 13, 2023

(87) PCT Pub. No.: WO2023/133598
PCT Pub. Date: Jul. 13, 2023

(65) Prior Publication Data
US 2024/0049046 A1 Feb. 8, 2024

Related U.S. Application Data

(60) Provisional application No. 63/266,624, filed on Jan. 10, 2022.

(51) Int. Cl.
*H04W 24/10* (2009.01)
*H04W 28/02* (2009.01)

(52) U.S. Cl.
CPC ....... *H04W 28/0278* (2013.01); *H04W 24/10* (2013.01); *H04W 28/0268* (2013.01)

(58) Field of Classification Search
CPC ............ H04W 28/0278; H04W 24/10; H04W 28/0268
USPC ........................................................ 370/329
See application file for complete search history.

(56) References Cited

U.S. PATENT DOCUMENTS

| 10,798,603 | B2 | 10/2020 | Chapman et al. |
| 11,184,843 | B2* | 11/2021 | Akman ................. H04W 48/06 |
| 2018/0270699 | A1 | 9/2018 | Babaei et al. |
| 2019/0274064 | A1* | 9/2019 | Chapman .............. H04W 72/52 |
| 2020/0077425 | A1 | 3/2020 | Silverman et al. |

(Continued)

FOREIGN PATENT DOCUMENTS

WO 2019177815 A1 9/2019

*Primary Examiner* — Chuong A Ngo
(74) *Attorney, Agent, or Firm* — Stoel Rives LLP

(57) ABSTRACT

An O-DU is configured to facilitate, in a 5G wireless communication system having a DOCSIS xhaul (fronthaul, midhaul, or backhaul) transport system, pipelined 5G and DOCSIS latency. The O-DU is configured to receive a slice-, device-, and service-aware buffer status report (SDSABSR) indicating a UE is requesting an uplink grant for data transmission in the 5G wireless communication system; generate, based on the SDSABSR, a slice-, device-, and service-aware bandwidth reporting (SDSABR) trigger for a CMTS; and provide to the CMTS the SDSABR trigger to cause the CMTS to make QoS and resource granting decisions relative other requests from other devices in response to the SDSABR trigger and before receiving the data transmission.

22 Claims, 15 Drawing Sheets

(56) References Cited

U.S. PATENT DOCUMENTS

| | | |
|---|---|---|
| 2020/0351717 A1 | 11/2020 | Bernstein et al. |
| 2020/0351729 A1 | 11/2020 | Rastegardoost et al. |
| 2020/0351935 A1 | 11/2020 | Chapman et al. |
| 2021/0195626 A1 | 6/2021 | Venugopal et al. |
| 2022/0030620 A1 | 1/2022 | Cirik et al. |
| 2022/0321566 A1* | 10/2022 | Coyle ................. H04L 63/0236 |

\* cited by examiner

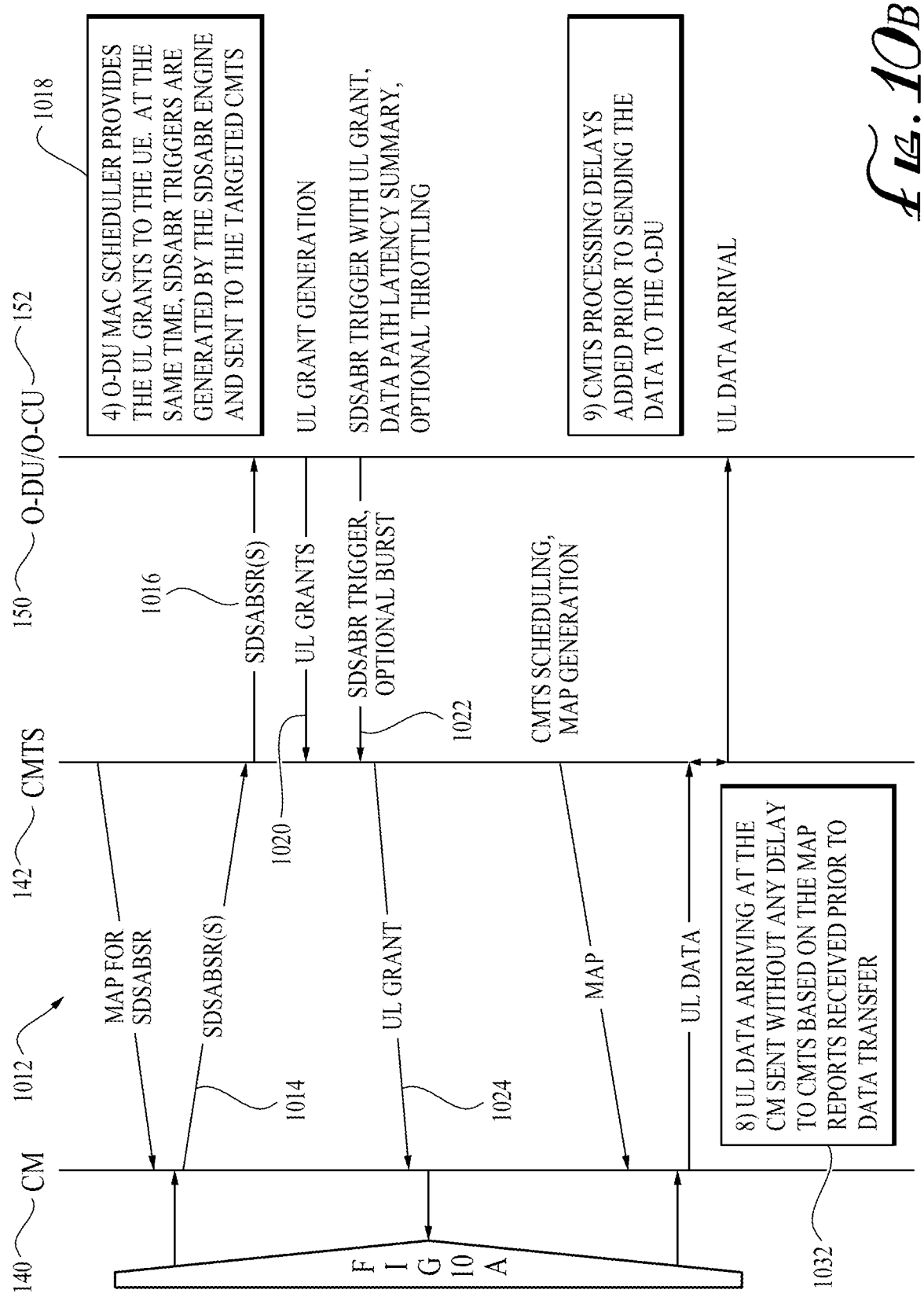

DYNAMIC SERVICE AWARE BANDWIDTH REPORTING AND MESSAGING FOR MOBILITY LOW LATENCY TRANSPORT

RELATED APPLICATION

This application is a National Stage of International Application No. PCT/US2023/060423, filed Jan. 10, 2023, which claims priority benefit of U.S. Provisional Patent Application No. 63/266,624, filed Jan. 10, 2022, which is hereby incorporated by reference in its entirety.

TECHNICAL FIELD

This application relates generally to wireless communication systems, and more specifically to techniques for reducing latency in 5G systems leveraging Data Over Cable Service Interface Specifications (DOCSIS) transports.

BACKGROUND INFORMATION

Factors such as massive growth in mobile high-speed data consumption and new citizens broadband radio service (CBRS) spectrum availability are driving different carriers—including mobile network operators (MNOs), multiple-system operators (MSOs), and fiber-to-the-home (FTTH) providers—to densify deployments by leveraging advances in 5G networking technologies. MSOs have an advantage of leveraging their ubiquitous, already-in-place hybrid fiber cable (HFC) infrastructures to offer mobile services, in addition to their residential and enterprise services delivery, without building CapEx-intensive all-optical access networks.

Cellular 5G standalone (SA) technology (defined per 3GPP Releases 15 and 16 standards), in conjunction with Open Radio Access Network (O-RAN) alliance driven radio access networking and its evolution, is expected to drive the adoption of software defined disaggregated mobility networking leveraging various modes of transport. Given a wide variety of architectural deployment options possible at the transport layer with the cloud native 5G access and core networks evolution, cable service providers could leverage their existing infrastructure or enhance it or switch to a new technology based on the 5G mobility requirements as well as differentiated services they plan to offer.

Supporting advanced wireless technologies such as 5G and certain mobility scenarios would entail additional demands. Advanced 5G applications delivery to the next generation of digital endpoints (smartphones, tablets, PCs, gateways, industrial grade devices, or other user equipment) can be severely impacted as a result of additive latency effects associated with the mobile air interface between the digital endpoint and O-RAN open distributed unit (O-DU) function as well as the HFC transport layer latency that connects the radio access to the core network and application functions.

For the cable service providers (i.e., MSOs) currently offering triple/quad play wireline and LTE/4G wireless services to residential and enterprise customers, they have an opportunity to offer standalone 5G mobility services leveraging their HFC transport architecture based on DOCSIS standards. Earlier generations of DOCSIS supported carrying mobile backhaul data (LTE/4G).

Low latency mobile xhaul (LLX) over DOCSIS technology was developed by Cable Television Laboratories, Inc. (CableLabs) of Louisville, Colorado in the CM-SP-LLX-I02-200623 specification "Data Over Cable Service Interface specification Mobile Applications" (LLX over DOCSIS technology). This technology was intended to overcome the transport network latency impacts when carrying LTE broadband data traffic. In other words, LLX expedites the packet processing in a converged wireless and wireline (HFC) transport architecture for use with LTE/4G.

The DOCSIS transport network that connects the critical components of the O-RAN and core network functions to deliver 5G services would add to the overall latency budget in addition to the air interface scheduling delays. As DOCSIS standards continue to evolve and enhance the broadband wireless and wireline convergence connectivity model, a cost-effective 5G mobility services with superior quality is desired.

SUMMARY OF THE DISCLOSURE

To overcome such limitations and service impacts to wireless customers, this disclosure describes enhancements to the LLX bandwidth reporting mechanism between the O-RAN O-DU MAC and DOCSIS cable modem termination system (CMTS) schedulers by addition of a dynamic policy engine that considers a wide variety of service aware system attributes. For instance, to provide enhanced end-user 5G mobility experience to the next-generation of digital endpoints, the LLX technology is enhanced by software defined intelligence in the O-DU MAC scheduler. A novel software application layer intelligence is securely embedded with the MAC layer software stack within the containerized O-DU network function. This is referred to as a slice-, device-, and service-aware bandwidth reporting (SDSABR) service that has internal mapping and reporting capabilities triggered based on a policy driven engine. This engine can be invoked by an external O-RAN service management/ orchestration layer either directly or indirectly via the O-DU controller, or it is locally provisioned on demand within the O-DU network function by the service provider. With integrated analytics capability, the SDSABR engine can monitor, trend the endpoint requested/granted flows for reporting to ensure the end user mobile service quality is not impacted as a result of transporting targeted service flows via the HFC infrastructure. O-RAN and DOCSIS transport systems along with their LLX technology are adapted to handling 5G service aware flows with intelligent analytics and coordinated policy driven method to deliver a superior end user performance for helping MSOs significantly drive their revenues when deploying new 5G mobility services.

MSOs could deploy O-RAN with an integrated gNB in which the O-RU, O-DU, and O-CU are aggregated together. In other embodiments, one or more of the O-RU, O-DU, and O-CU are disaggregated, with the O-DU function integrated with O-RU or O-CU or even completely distinct when traversing through the HFC infrastructure. To ensure the end user's 5G applications performance, the end-to-end (E2E) transport layer latency between the access, transport, and core network functions is controlled with an external reference clock or timing source such as a GPS receiver. A tighter control in the O-RAN layer is described, specifically for the fronthaul where the latency requirements are more stringent than in the midhaul and backhaul deployments.

Dynamic bandwidth reporting intelligence in the O-RAN O-DU network function benefits global MSOs targeting to offer 5G mobility services that will be transported on their DOCSIS standards-based HFC transport network infrastructure. Cable MSOs, wireless carriers, network infrastructure vendors, chipset, and tool vendors, and IoT applications service providers can collectively benefit in the development of this ecosystem and from the introduction of innovative mobile LLX enabled services via HFC-DOCSIS transport. Globally, MSOs can leverage their HFC infrastructure with software defined feature capabilities for high performance 5G O-RAN enabled services introduction and drive phased evolution via software enhancements.

In some embodiments, the O-RAN O-DU is designed with embedded SDSABR intelligence based on a policy driven method considering the individual end point (smartphone, tablet, PC, IIoT devices, etc.) and service flow level within the complex MSOs network infrastructure. Proactive monitoring of the O-DU network function and the embedded SDSABR intelligence reporting is achieved via open standards management interface towards the O-RAN orchestrator as well as the 3GPP standards defined E2 interface via the Near Real Time RAN Information Controller (NearRT-RIC) closed-loop monitoring of SDSABR triggers. With an efficient tracking method at the serving cell as well as at the DU node level and trending them on a cell-by-cell as well as DU nodal basis, proactive triggers could be alerted towards external network functions such as the O-CU network function and/or the DOCSIS/5G core network domain orchestrators to take intelligent actions for end points in a targeted geographical coverage area.

Competitive 5G O-RAN based service offerings by MSOs could be leveraged across multiple industry verticals. The disclosed embodiments provide significant network CapEx and OpEx savings to MSOs allowing them to utilize their geo-optimized integrated mobile and HFC network infrastructure for targeted 5G mobility services introduction. The embodiments will drive continuous 5G services evolution via leveraging HFC transport, security and reliability enhancements with future spectrum licensing, licensed and unlicensed band allocations, geo-optimized traffic switching between cells based on LLX enabled service layer performance and dynamics of the radio channel conditions. The embodiments provide an ability to support multiple digital endpoints such as CPE/gateways and radio access technologies including 3GPP/Non-3GPP/O-RAN/IEEE-Wi-Fi standards/alliances and their evolution when leveraging HFC transport architecture.

Additional aspects and advantages will be apparent from the following detailed description of embodiments, which proceeds with reference to the accompanying drawings.

BRIEF DESCRIPTION OF THE DRAWINGS

To easily identify the discussion of any particular element or act, the most significant digit or digits in a reference number refer to the figure number in which that element is first introduced.

FIG. 10A and FIG. 10B are, respectively, left- and right-sides of a message sequence diagram for the DOCSIS fronthaul transport system shown in FIG. 9, in accordance with one embodiment.

DETAILED DESCRIPTION OF EMBODIMENTS

Figure 1:
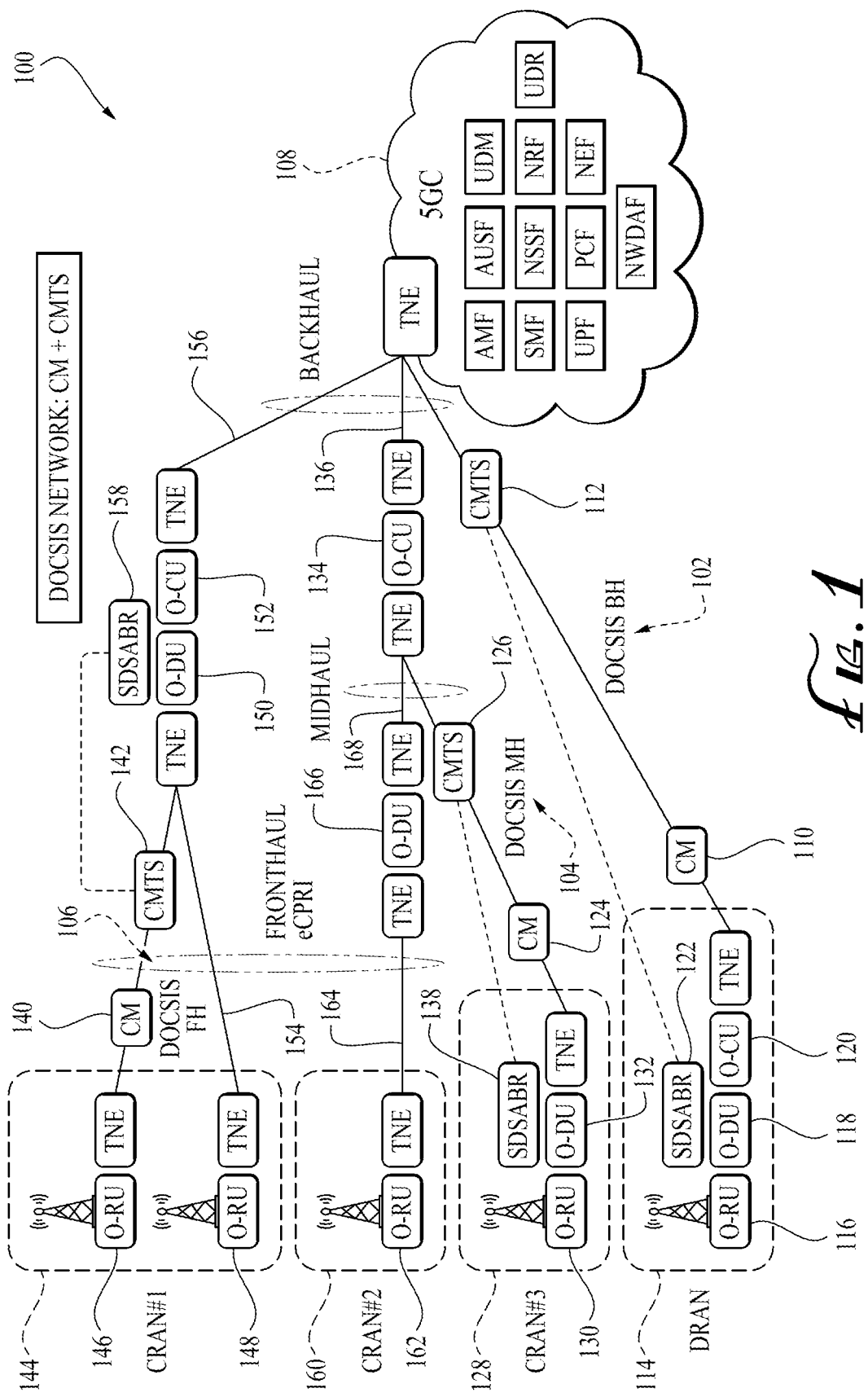
FIG. 1 is a network diagram showing multiple xhaul transport modes and topologies, in accordance with one embodiment.

DOCSIS technology provides a baseline for mobile xhaul, however, advanced 5G mobile applications such as ultra-reliable low latency communications (URLLC) employ much more stringent service-level agreements (SLAs). For emerging 5G applications, latency SLAs need much tighter control (1-2 msec). Latency in DOCSIS networks would increase with network topology, capacity, or traffic loading. Typical upstream latencies can vary from 8-12 msec to a maximum of 50 msec, depending on the network deployment scenarios.

LLX technology is designed to work for a variety of xhaul deployment scenarios over DOCSIS and PON networks. LLX technology reduces the latency incurred by mobile traffic when using DOCSIS as the xhaul transport solution (xhaul generically refers to any transport network classes). LLX enhances DOCSIS 3.0+ network performance with a latency that is comparable to fiber. It acts as a software upgrade capability within the CMTS scheduler so LTE traffic can be more efficiently backhauled via DOCSIS transport. When operated serially, however, latency adds up and will impact advanced applications such as CV2X, HD video, AR-VR-XR, gaming, and others. The 5G end-to-end network latency and resulting end user service performance could be significantly impacted due to a wide variety of system attributes including the following:

- user equipment device types (smartphones, tablets, PCs, industrial IoT devices, AR-VR-XR headsets, and other types of devices);
- user identities that are known by SUPI/IMSI (MCC/MNC) and equipment identity;
- service flows per device/user, multiple service flows, priority access, QoS per flow (non-GBR vs. GBR bearers); for example, gaming application using a non-GBR latency sensitive flow vs. eMBB application;
- differentiated latency between multiple endpoints in a serving cell tracking to zero for uniformity in their path behavior etc.;
- group identifiers based on a certain range of SUPI/IMSI (MCC/MNC) values, multicast group identities;
- cell dynamics and resulting RF signal variations due to radio conditions;
- proximity within a given geography/radio-coverage area for impending public safety issues;

mobility within a cell and between cells;
switching across multiple radio access technologies (3GPP and non-3GPP such as Wi-Fi/Wi-Fi6 and their evolution); SDSABR trigger when the underlying MAC scheduler works even when the O-DU connectivity to the near RT-RIC suffers transient failure due to the link/nodal technical or operational issues;
throttling of the UE requests, bundling of these burst requests into a SDSABR trigger to save overhead;
prioritize or adapt the SDSABR trigger towards CMTS based on learned or a priori knowledge about how long it takes for the UE to start transmitting (slow vs. fast start—device that is waking up slowly vs. faster);
DRX for IOT devices, device complexity; and
public/private/hybrid cloud hosted centralized radio access/core network functions and application servers in centralized/distributed data centers.

LLX defines the architecture and requirements that allows MSOs to benefit from their HFC network infrastructure assets by providing cost-effective transport services to their legacy/5G mobile traffic or other MNOs (mobile virtual network operator, MVNO). LLX can be enhanced to achieve the desired QoS and reduction in upstream latency using DOCSIS transport network by providing: the coordinated scheduling technique for E2E latency reduction, i.e., a SDSABR trigger that facilities an external bandwidth request from a DOCSIS system sometime in future, before the actual traffic is dispatched; a common QoS framework for mobile and the DOCSIS xhaul transport ensures E2E QoS treatment of mobile traffic; the optional cable modem (CM) grant sharing feature in DOCSIS 3.1/4.0 (enables real-time grant sharing decisions made by a CM) introduced to provide the lowest latency to the highest priority traffic and to enable efficient DOCSIS bandwidth utilization under certain network conditions; the external request could be from any access entity (LTE, 5G NR, O-RAN, and Wi-Fi); and the eNB/gNB provides a future traffic profile through the SDSABR trigger, allowing the CMTS to make QoS and granting decisions earlier than it normally would.

As 5G SA network architectures embrace O-RAN standards and adopt the use of disaggregated software defined radio access and core network functions, the mobile xhaul (where "x" may be fronthaul, midhaul, or backhaul) transport strategies become a consideration for E2E services delivery. Carriers with licensed or unlicensed low, mid, or high band spectrum availability intending to launch 5G mobile services based on SA network architecture designs should evaluate their backhaul scaling strategies to ensure they are capable of meeting latency demands placed by the emerging 5G applications.

FIG. 1 provides an overview of examples of a 5G and DOCSIS network 100 in which multiple DOCSIS topologies exist for xhaul—including a DOCSIS backhaul transport system 102, a DOCSIS midhaul transport system 104, and a DOCSIS fronthaul transport system 106—depending on operator deployment strategies for connecting to a 5G core network 108. Each of these topologies is shown as supporting SDSABR capability (described below) to reduce the latency associated with end user/device-dependent 5G service flows.

DOCSIS backhaul transport system 102 includes a CM 110 and a CMTS 112 to provide connectivity between 5G core network 108 and a distributed RAN (DRAN) architecture, DRAN integrated gNB 114. DRAN integrated gNB 114 includes an O-RAN radio unit (O-RU), O-RU 116; an O-RAN distributed unit (O-DU), O-DU 118; and an O-RAN central unit (O-CU), O-CU 120. An SDSABR engine 122 is implemented in O-DU 118. (Transport network elements (TNEs) are also shown but omitted in other figures for simplicity.) Additional details for DOCSIS backhaul transport system 102 are provided with reference to FIG. 2-FIG. 5 and FIG. 8.

DOCSIS midhaul transport system 104 includes a CM 124 and a CMTS 126 to provide connectivity between 5G core network 108 and a centralized RAN (CRAN) architecture, CRAN gNB 128. CRAN gNB 128 includes an O-RU 130 and an O-DU 132 connected by DOCSIS midhaul transport system 104 to an O-CU 134, which is connected by a backhaul 136 to 5G core network 108. An SDSABR engine 138 is implemented in O-DU 132. (TNEs are also shown but omitted in other figures for simplicity.) Additional details of DOCSIS midhaul transport system 104 are provided with reference to FIG. 7 and FIG. 8.

DOCSIS fronthaul transport system 106 includes a CM 140 and a CMTS 142 to provide connectivity between 5G core network 108 and a centralized RAN (CRAN) architecture, CRAN gNB 144. CRAN gNB 144 includes an O-RU 146 and an O-RU 148. O-RU 146 is connected by DOCSIS fronthaul transport system 106 to an O-DU 150 that is connected with an O-CU 152. O-RU 148 is connected by another fronthaul 154, such as an optical distribution network or a direct fiber link, to O-DU 150 and O-CUs 152, which are connected by a backhaul 156 to 5G core network 108. Accordingly, there are two fronthaul transport connections to O-DU 150 (DOCSIS based and fiber based), which could be used for traffic switching during failover (e.g., DOCSIS outage). An SDSABR engine 158 is implemented in O-DU 150. (TNEs are also shown but omitted in other figures for simplicity.) Additional details of DOCSIS fronthaul transport system 106 are provided with reference to FIG. 9-FIG. 12.

FIG. 1 also shows another example of a different CRAN architecture. A CRAN gNB 160 shows an O-RU 162 connected by a fronthaul 164 to an O-DU 166, which is connected by a midhaul 168 to O-CU 134, which is connected by backhaul 136 to 5G core network 108. Thus, O-CU 134 is connected to multiple O-DUs.

Midhaul 168 connectivity is possible via a direct fiber link between O-DU 166 and O-CU 134 (compared to DOCSIS midhaul transport system 104). In some embodiments, the operator could potentially switch the midhaul connections based on failover of primary DOCSIS midhaul transport system 104 (link failure as well as a network outage) and ensure that there is no loss of service continuity to the digital endpoints.

For simplicity, FIG. 1 shows a dedicated CMTS model. Shared CMTS models are described later with reference to FIG. 11 and FIG. 12.

Figure 2:
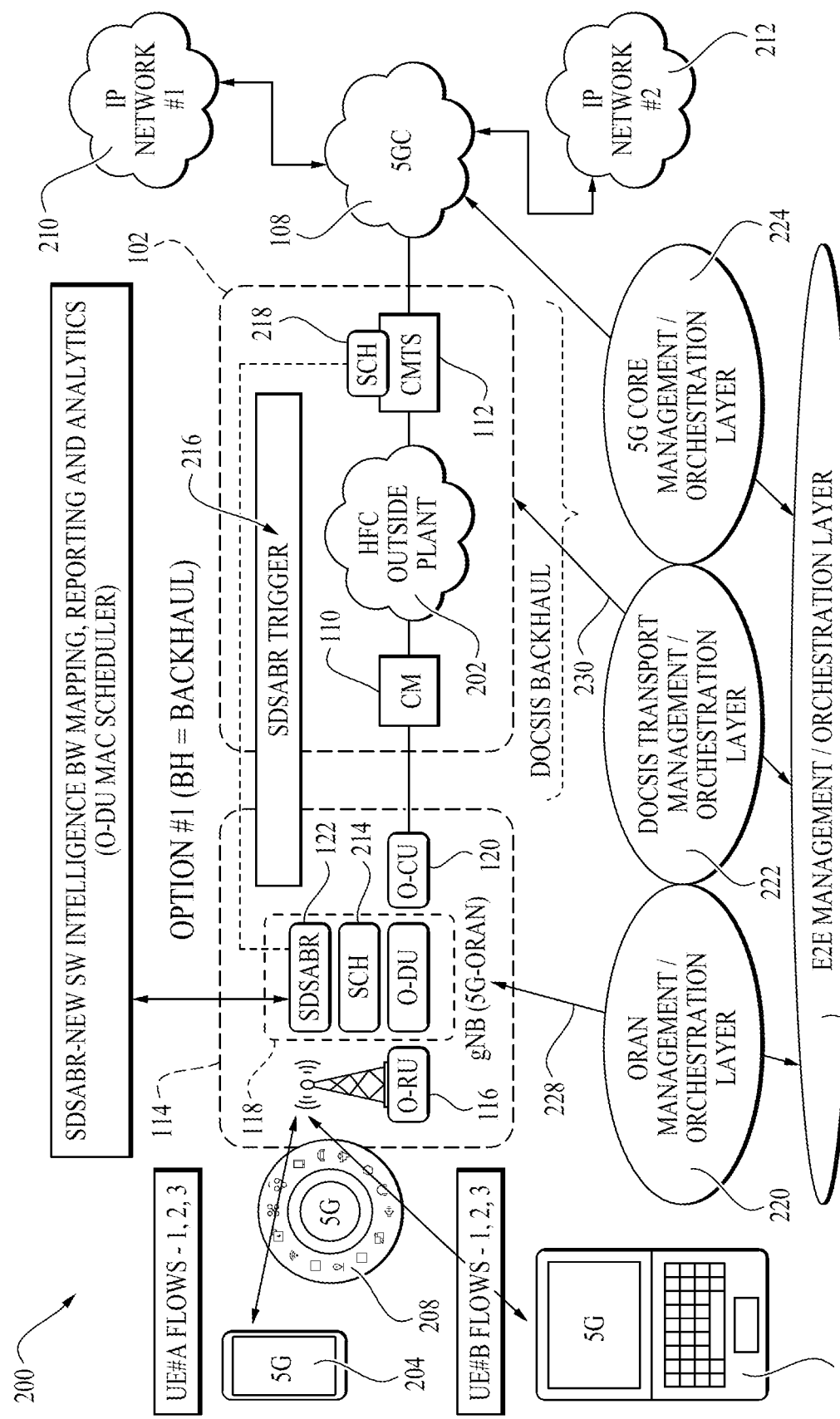
FIG. 2 is a network diagram showing a DOCSIS backhaul transport system, in accordance with one embodiment.

FIG. 2 shows an example of SDSABR for 5G users with DOCSIS backhaul transport 200, which enhances the 5G end user experience on a per UE, per flow basis when leveraging DOCSIS backhaul transport system 102 (shown with an HFC 202). Specifically, a first UE 204 and a second UE 206 generate 5G data flows 208 handled by DRAN integrated gNB 114, DOCSIS backhaul transport system 102, 5G core network 108, and a first IP network 210 or a second IP network 212.

DRAN integrated gNB 114 acts as the access entity (AE), which is where a mobile air interface resource scheduler 214 resides, as implemented in O-DU 118 with SDSABR engine 122. SDSABR engine 122 has an embedded client (see e.g., FIG. 5) that can create an SDSABR trigger 216 towards a scheduler 218 of CMTS 112. SDSABR engine 122 allows DRAN integrated gNB 114 to request bandwidth from DOCSIS backhaul transport system 102 for a specific time in the future, prior to the arrival of the actual traffic from first UE 204 or second UE 206 (see e.g., FIG. 3 and FIG. 8). The traffic may be in the form of a single service flow or multiple service flows at any given time from an end user or device that is configured for one or both 5G and Wi-Fi communications. DRAN integrated gNB 114 provides a service aware traffic profile for a given user via SDSABR trigger 216 allowing scheduler 218 of CMTS 112 to make QoS/granting decisions earlier than it would normally so as to reduce the aggregate latency experienced by the traffic flows originating from first UE 204 or second UE 206.

SDSABR trigger 216 is an external layer 3 message that is transmitted from DRAN integrated gNB 114, transparently via CM 110 to CMTS 112. As opposed to the sequential process of generating an internal layer 2 request message by a CM for 5G uplink data arriving at its end, SDSABR trigger 216 acts immediately upon the detection of data arriving at DRAN integrated gNB 114 to send a report to scheduler 218 of CMTS 112. SDSABR trigger 216 at DRAN integrated gNB 114 considers any of the following system attributes below with the metadata model sent to CM 110:

| Information | Example Category or Value | Description |
| --- | --- | --- |
| UE category or device type | smartphones, tablets, PCs, industrial IoT devices, AR-VR-XR headsets, and other types of devices | The UE category is used as an attribute in the SDSABR policy triggering to ensure there is intelligent differentiation in the quality of service flows when requesting high-speed connections leveraging the DOCSIS transport. For example, IoT category type of UEs may get a lower priority vs smartphone users. Certain categories of UEs (priority access, public safety and emergency) may always include this information while some other IoT device categories (utilities such as smart meters) could have this as an optional attribute. |
| radio access technology (RAT) type | 3GPP (5G/5G advanced), non-3GPP | The RAT type is an attribute in the decision-making process as the service flows over 3GPP technologies get higher prioritization and treatment when compared to non-3GPP/Wi-Fi flows leveraging the common DOCSIS transport. |
| single user identity | IMSI, SUPI | The user identity acts as a means to enable the SDSABR trigger to determine the policy enforcement required to achieve desired service layer performance. For example, an MSO customer delivering an enhanced service experience to its home user vs a roaming user trying to roam into the MSO network due to mobility and accessing the DOCSIS infrastructure to receive 5G services. |
| group identity | unique group identifier | UE of a specific identity that belongs to a specific group, e.g., multicast group. The group identity acts as a means to enable the SDSABR trigger to determine the policy enforcement required to achieve desired service layer performance for a group of users within a given IMSI/SUPI range belonging to the MSO customer vs its roaming partner user group. As a result, the MSO home user group gets enhanced treatment for the requested service flows via DOCSIS vs roaming partners service flows. This will help the MSO enforce the right roaming restrictions when enabling SDSABR flows to achieve the desired SLAs for home vs roaming user groups. |
| priority access | emergency, high, or low | The priority access is an attribute for emergency capable devices which require the best possible service delivery and thus the SDSABR policy engine can leverage the priority access attribute when signaled in their registration procedures. |
| complexity | low, power savings | This may be an optional attribute. |
| number of service flows | integer value | number or service flows per UE, which may be a single flow or multiple flows |
| slice IDs | integer value | Slice IDs are useful for public safety and/or emergency use cases where they need to be steered in real time to a specific radio access and core network slice due to resource availability, consumption, and constraints. This could imply that the SDSABR triggering operating for a given user in a given O-DU may need to have a hitless switching to an alternate O-DU when such user and/or group of users request access with the service level guarantee in an emergency and/or disaster situation (inclement weather, fires, flooding, earthquake, tsunami warning etc.) and provide seamless service continuity. The |

-continued

| Information | Example Category or Value | Description |
| --- | --- | --- |
| | | bandwidth allocations and cross-layer cross-nodal service profile mappings are determined based on these policy triggers to ensure the DOCSIS transport with its resources operating constraints meets the needs of such users with the right priorities. |
| service flow ID | 32-bit SFID (Service Flow Identifier) | This is an attribute for the SDSABR policy engine to drive the decision-making process to enable the flows with highest priority in conjunction with the other system attributes to get the best possible treatment. The service flow ID may indicate an IoT flow, voice flow, gaming flow, and the like. |
| 5QI identifier | integer value | The 5G QoS Identifier is used in 3GPP to identify a specific QoS forwarding behavior for a 5G QoS flow (similar to the QCI value used for LTE). As such, it defines packet loss rate, packet delay budget etc. |
| serving cell ID | integer value | Standards defined identifier that can be used for tracing the request originating from a specific cell and be used to switch the user to a different neighboring cell on demand when required (example: emergency situations, traffic congestion but requesting a guaranteed service flow for a premium subscriber). |
| serving cell with O-DU ID | integer value | in case of multi-O-DU/O-RU deployment, described later with reference to FIG. 12 |
| latency of the data path towards the targeted CMTS scheduler | floating point value | value in ms |

In some embodiments, to ensure the SDSABR trigger is accurate across multiple O-RU cells and its subtending users served by a single or multiple O-DUs, an SDSABR engine within each O-DU can define a unique service identifier that maps the traffic flow originating from a given user via its serving cell ID along with the device category, priority access, traffic identifier with quality of service, requested slicing information, its default grid in terms of radio coverage, and other service characteristics. Each SDSABR engine also considers a O-DU node identifier in a multi-O-DU deployment scenario to ensure that the SDSABR triggers created are uniquely defined, tagged with the correct O-RU+O-DU combination, triggered and accounted for during the message handshaking towards the serving CMTS scheduler.

O-DU 118 determines UE grants for each timeslot and thus this information is exchanged in SDSABR trigger 216 towards CMTS 112. SDSABR engine 122 also keeps track of the SDSABR trigger information reported for every timeslot granted to the serving UE and reports to an O-RAN management layer 220 for analytics, historical trending, and use in conjunction with a DOCSIS/CMTS transport management layer 222 and a 5G core management layer 224. Each layer is managed through a common network management system, E2E management 226 (see e.g., FIG. 6).

E2E management 226 is an orchestration engine that may be a cloud native hierarchical application which has a multi-domain relationship with its subtending domain specific orchestrators. For example, DRAN integrated gNB 114 has its own orchestrator (O-RAN management layer 220) with open standards-based REST/API triggers 228 from the network functions O-RU 116, O-DU 118, and O-CU 120. Similarly, the DOCSIS network has its own orchestrator, (DOCSIS/CMTS transport management layer 222) with REST/API triggers 230 to manage CMTS 112 and CM 110 network infrastructure. And 5G core network 108 has its own domain network orchestrator, 5G core management layer 224, to manage the various core network applications running as containerized microservices on a cloud native infrastructure. The multi-domain orchestrator, E2E management 226, therefore, has an aggregated view of the O-RAN, integrated transport, and core network infrastructure.

Figure 3:
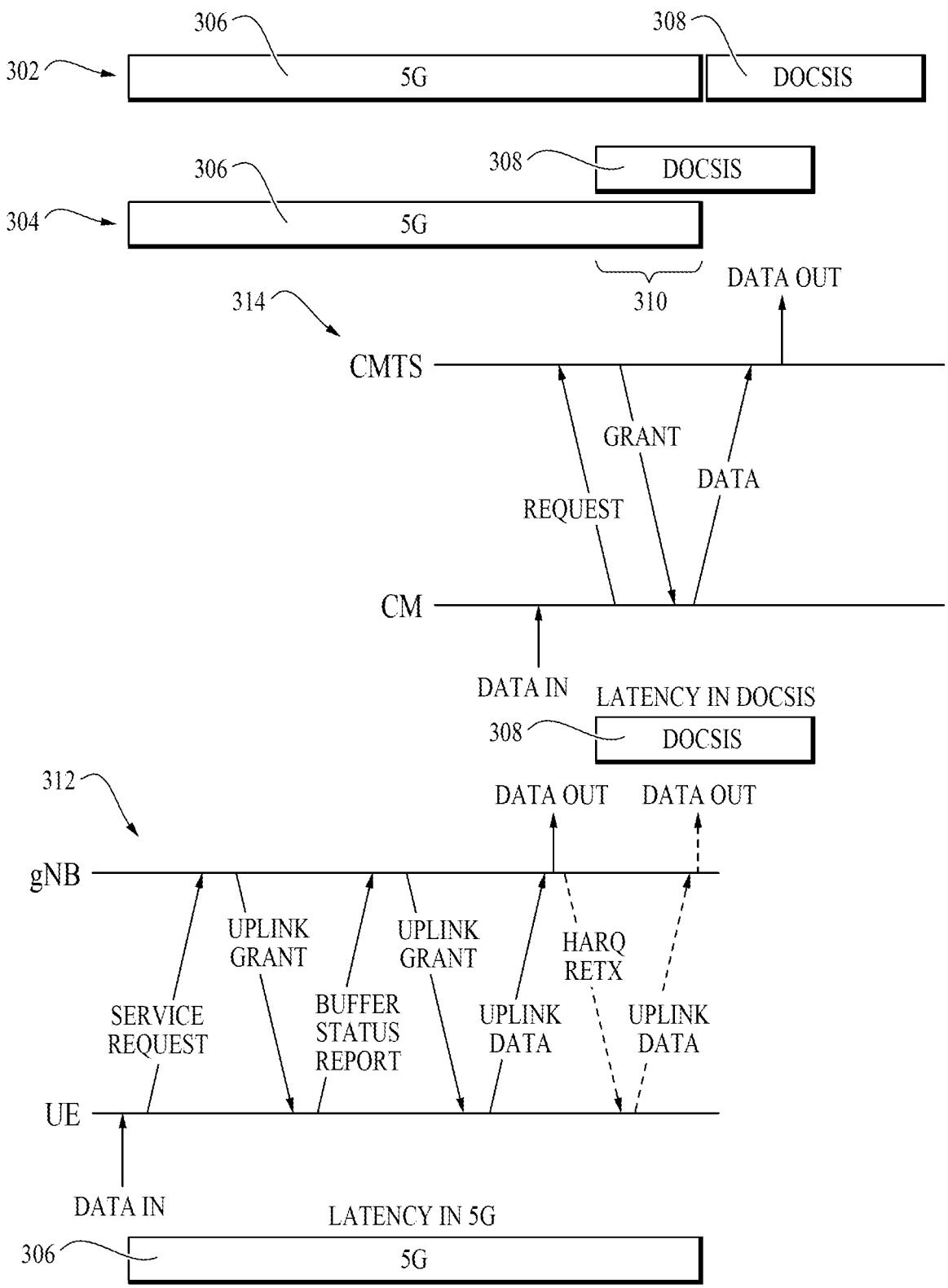
FIG. 3 is a set of latency timing diagrams for conventional and pipelined DOCSIS transport, in accordance with one embodiment.

FIG. 3 is a latency timing diagram 300 showing conventional latency timing 302 and SDSABR pipelining latency timing 304. In conventional latency timing 302, a latency in 5G 306 and a latency in DOCSIS 308 are essentially summed. Sequential processing of 5G data in O-RAN and DOCSIS leads to additive latency and thus a smart pipelining approach is employed with service aware intelligence. In SDSABR pipelining latency timing 304, latency in 5G 306 and latency in DOCSIS 308 at least partly overlap 310 so as to reduce the overall latency.

FIG. 3 also shows additional details of overlapping timing in 5G communications 312 and DOCSIS communications 314. Request and grant mechanisms for channel access in the two technologies (5G/LTE, DOCSIS) is enhanced with a SDSABR trigger capability to avoid the sum in the latency equation via coordinated scheduling. This creates a pipeline model with parallel communication.

Figure 4:
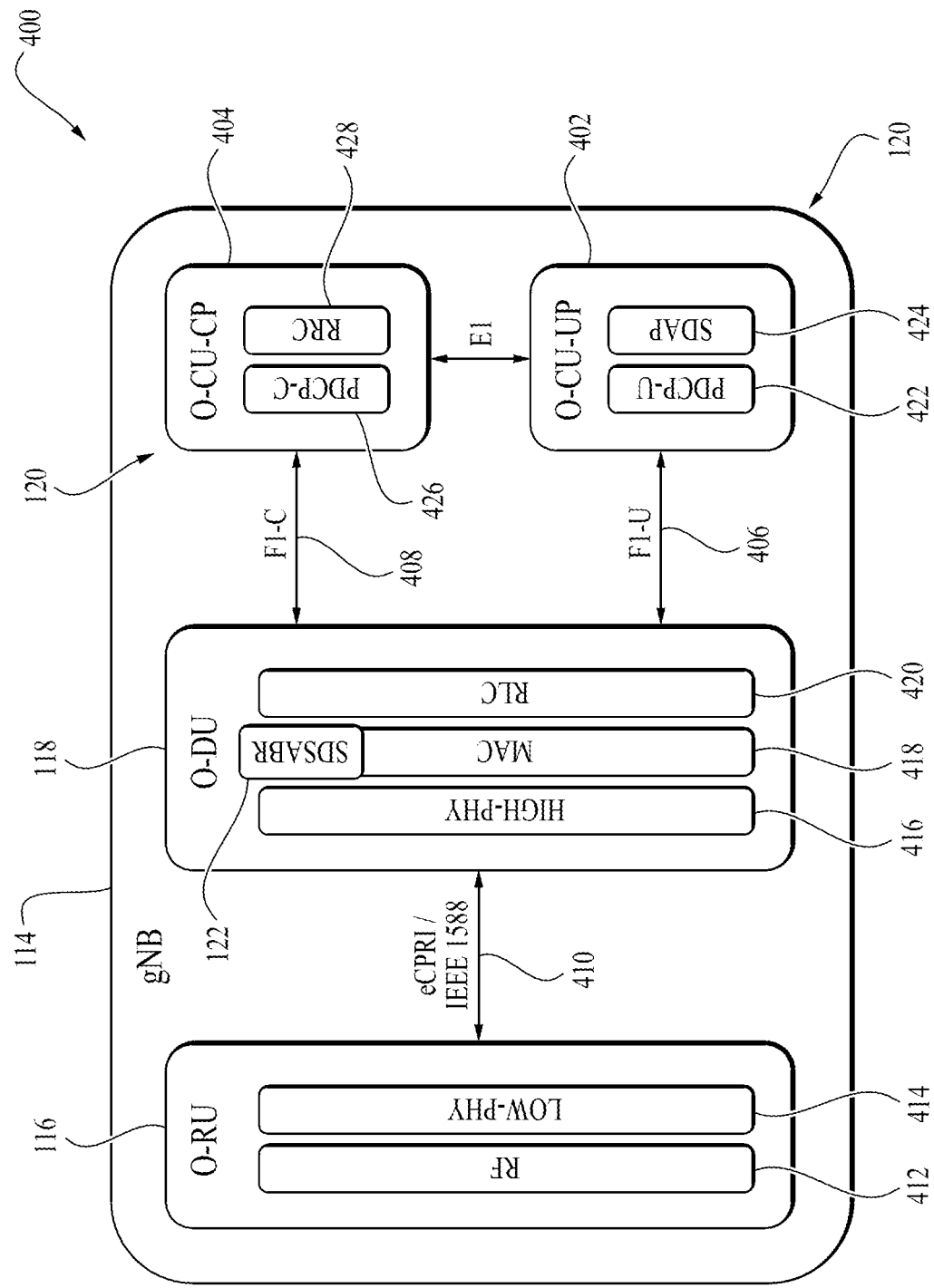
FIG. 4 is a network stack block diagram of an integrated gNB, in accordance with one embodiment.

FIG. 4 shows a 5G O-RAN SA control and user plane separation (CUPS) architecture 400. 5G O-RAN SA control and user plane separation (CUPS) architecture 400 comprises a 5G core network (not shown) and DRAN integrated gNB 114 split into two logical network functions: O-DU 118 and O-CU 120. O-CU 120 is shown with separate user and control planes, respectively, O-CU-UP 402 and O-CU-CP 404. Disaggregated O-CU-UPs 402, O-CU-CPs 404, and O-DU 118 network functions are connected via standard interfaces F1-U 406 and F1-C 408. And DRAN integrated gNB 114 is connected to the 5G core network 108 (FIG. 1) via DOCSIS backhaul transport system 102 (FIG. 1).

FIG. 4 also shows DRAN integrated gNB 114 includes O-RU 116, which has an architecture that is not specified in 3GPP standards. O-RU 116 and O-DU 118 are connected via a common public radio interface (CPRI), eCPRI/IEEE 1588 410. CPRI is a fronthaul wireless link for LTE, 4G, and 5G operators.

O-RU 116, O-DU 118, O-CU-UP 402, and O-CU-CP 404 implement a network stack. Specifically, O-RU 116 includes a radio frequency (RF) layer, RF 412; and a low physical (PHY) layer, Low-PHY 414. O-DU 118 includes a high PHY layer, high-PHY 416; a medium access control (MAC) layer, MAC 418; and a radio link control (RLC) layer, RLC 420. O-CU-UP 402 includes a packet data convergence protocol (PDCP) layer, PDCP-U 422; and a service data adaption protocol (SDAP) layer, SDAP 424. O-CU-CP 404 also includes a PDCP layer, PDCP-C 426; and a radio resource control (RRC) layer, RRC 428.

In the example of 5G O-RAN SA control and user plane separation (CUPS) architecture 400, SDSABR engine 122 is shown being implemented at the level of MAC 418.

Figure 5:
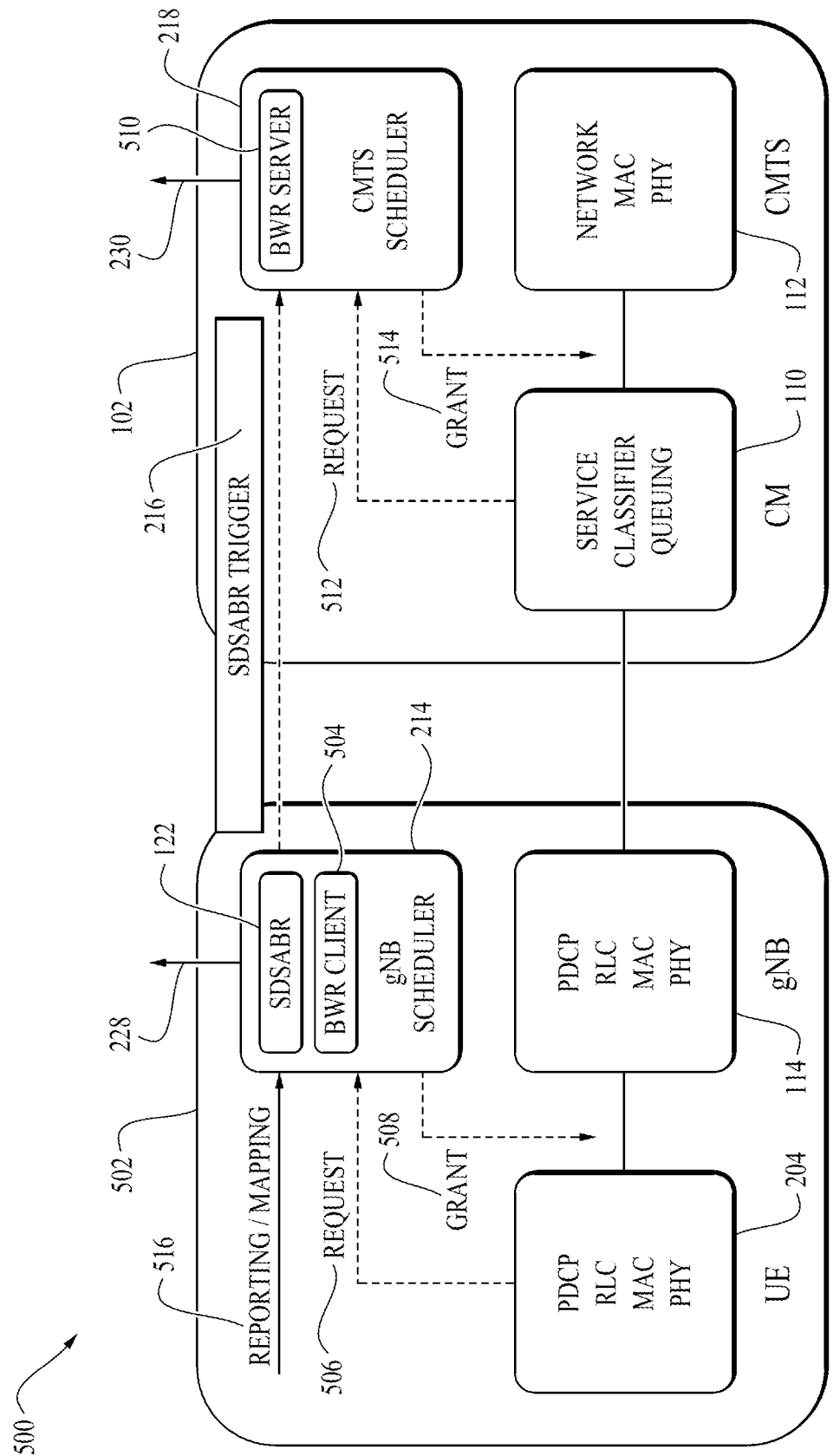
FIG. 5 is an SDSABR handshaking block diagram, in accordance with one embodiment.

FIG. 5 shows an example of SDSABR handshaking in a 5G deployment with DOCSIS xhaul transport system 500. 5G deployment with DOCSIS xhaul transport system 500 includes a 5G communication system 502 and a DOCSIS backhaul transport system 102. 5G communication system 502 includes first UE 204 and DRAN integrated gNB 114. DOCSIS backhaul transport system 102 includes a CM 110 and a CMTS 112. As explained below, in both 5G communication system 502 and DOCSIS backhaul transport system 102, a request and grant mechanism is used to ensure there is a medium allocated for data transmission.

A mobile air interface resource scheduler 214 of DRAN integrated gNB 114 (e.g., in the O-DU MAC scheduler) includes an SDSABR engine 122 and a bandwidth reporting (BWR), BWR client 504. When first UE 204 needs to connect to the IP network and transfer data, it sends an uplink request 506 for an uplink grant 508 from DRAN integrated gNB 114 so that first UE 204 can send data queued in its buffer status report. BWR client 504, upon receiving uplink request 506, triggers SDSABR trigger 216.

Scheduler 218 of CMTS 112 includes a BWR server 510 to receive from BWR client 504 SDSABR trigger 216. In some embodiments, BWR server 510 and BWR client 504 are also configured for supporting legacy BWRs. SDSABR trigger 216 includes information about the service flows and metadata associated with each upstream flow expected to arrive at DRAN integrated gNB 114 and to be relayed to CM 110 for transport across DOCSIS backhaul transport system 102. SDSABR trigger 216 is transmitted from DRAN integrated gNB 114 to CMTS 112 via CM 110 in a dedicated mapped-service flow that is aligned across the mobility and DOCSIS transport. The mapping of SDSABR trigger 216 has a policy driven QoS as it needs to be transported via CM 110 towards CMTS 112. The QoS alignment is provided to ensure SDSABR trigger 216 get the right prioritization based on the mapping to a service flow that is tagged to each SDSABR trigger 216 during transport from CM 110 to CMTS 112. SDSABR trigger 216 indicates service-aware scheduling decisions and flows well in advance to scheduler 218 to ensure a CMTS request 512 and a CMTS grant 514 in DOCSIS backhaul transport system 102 happen in parallel while the data is about to arrive at CM 110 from DRAN integrated gNB 114. Once the CMTS grant 514 is received, the data packets corresponding to the service flow arriving at DRAN integrated gNB 114 is relayed to CM 110 without any further processing delay to be transported across the DOCSIS transport towards scheduler 218 of CMTS 112 with appropriate mapping.

FIG. 5 also shows SDSABR reporting/mapping 516. A purpose of SDSABR reporting/mapping 516 is to ensure that CMTS 112 can process SDSABR trigger 216 and prioritize these requests internally prior to sending them to its internal MAC scheduler. Since CMTS 112 can be deployed in multiple configurations—such as an integrated CMTS, virtualized CMTS, disaggregated CMTS with a core and remote PHY device—the MAC scheduler resident in the core should ensure that SDSABR triggers 216 are processed with the right priority to ensure that the grants are efficiently generated, processed, and delivered to CM 110. The CMTS MAC scheduler may run on a general-purpose COTS networking infrastructure which could be quite distinct from a 5G network infrastructure layer. Hence the SDSABR prioritization ensures that the latency associated with the non-uniform infrastructure layers and their resulting packet processing performance is considered in its policy driven engine-based decision making to ensure that the end user service layer performance criteria is met when transported via the DOCSIS layer.

In a complex network deployment with multiple O-RUs serving a large geographical area, a single O-DU can aggregate the traffic from multiple O-RUs. Similarly, it is possible for multiple O-DUs to aggregate data from multiple O-RUs and transfer them to one or more O-CUs in a centralized location. Thus, in some embodiments, an SDSABR mapping engine considers the O-RAN deployment topology and has a flexible means to map the SDSABR flows across the network interfaces connecting the O-DU to O-CU and to the core network via DOCSIS transport.

Figure 6:
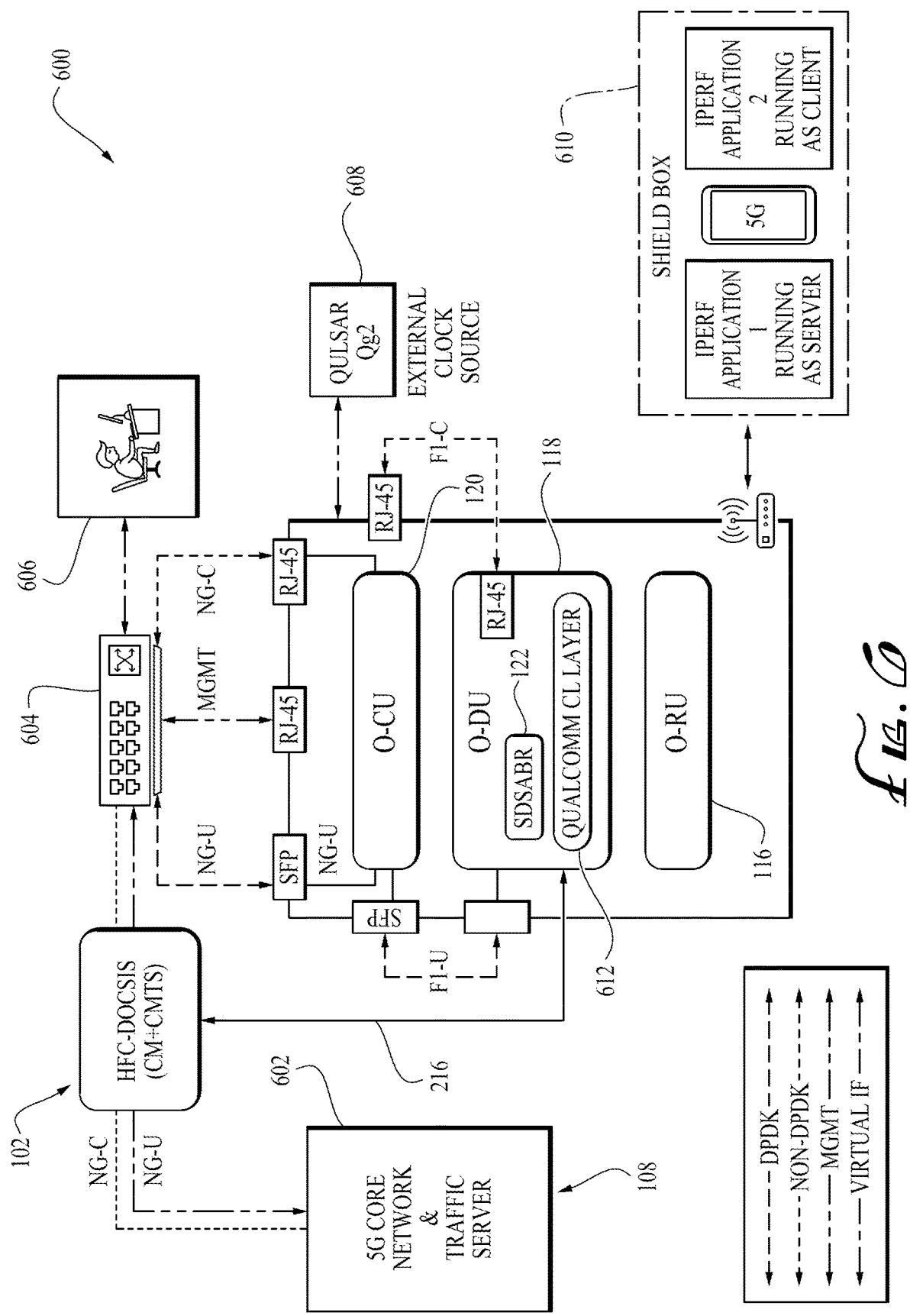
FIG. 6 is a block diagram of an orchestration engine, in accordance with one embodiment.

FIG. 6 shows a test bed 600 including a server 602 for connectivity to 5G core network 108, DOCSIS backhaul transport system 102, O-RU 116, O-DU 118, O-CU 120, SDSABR engine 122, an L3 switch (implementing E2E management 226) 604, an E2E network operator/customer care/NOC operator 606, an external clock source 608, a shield box 610, and a CL layer 612.

The network provider can extract management and analytics information from each of the underlying O-RAN, DOCSIS/fiber transport and core network domains via switch 604 to develop a cross-layer integrated view of the applications and infrastructure layer. The SDSABR triggers reported from within the O-RAN domain could be used to drive critical data insights at a finer radio access network granular level that could be used to correlate the application and service behaviors of a targeted endpoint(s) of various types in a given geographical area with ultra-high accuracy and hence take proactive measures to mitigate their performance based on requested service flows as well as end point mobility dynamics in near real time.

Figure 7:
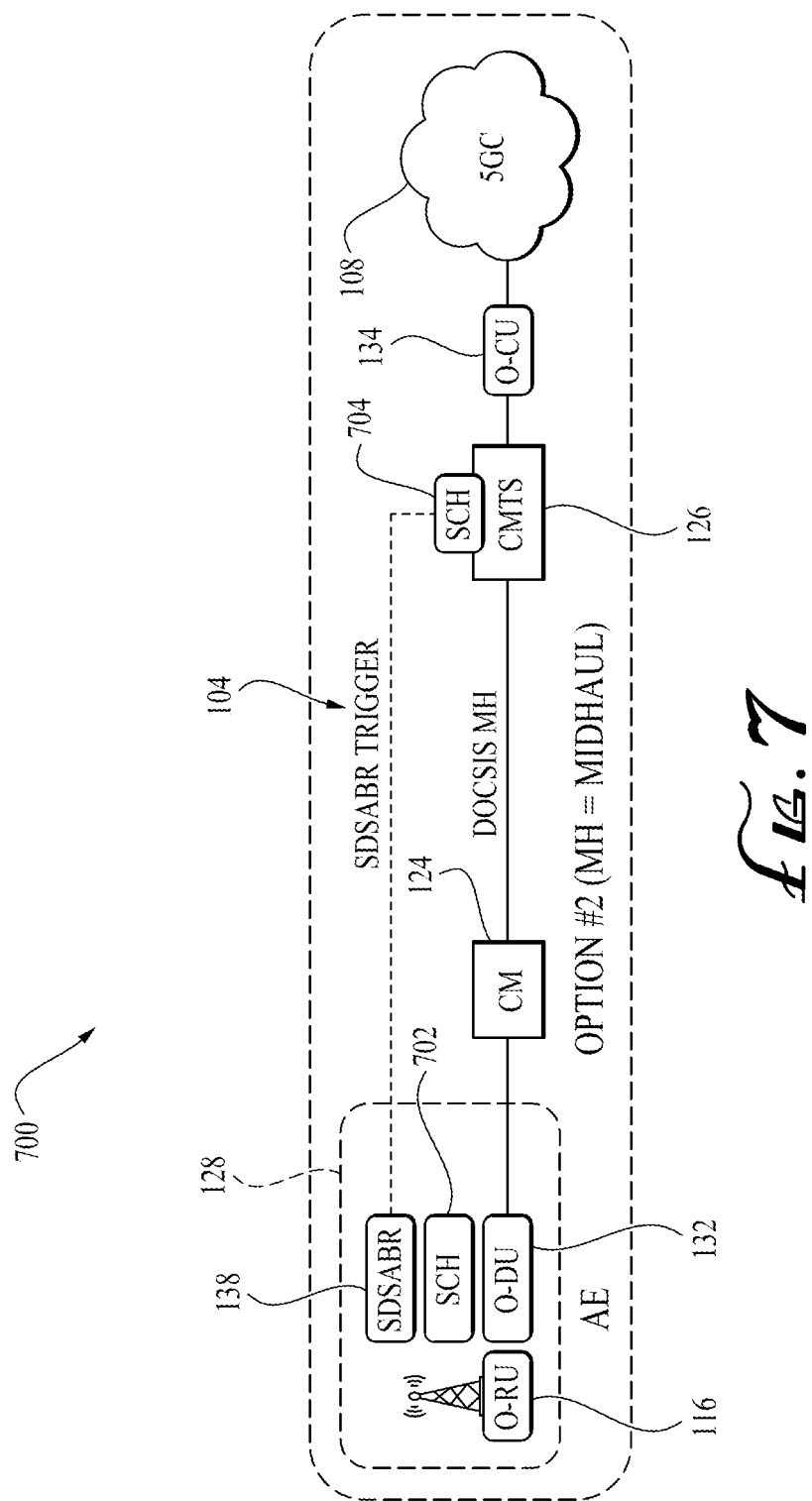
FIG. 7 is a network diagram showing a DOCSIS midhaul transport system, in accordance with one embodiment.

FIG. 7 shows DOCSIS midhaul transport system 104 in greater detail. Specifically, FIG. 7 shows a scheduler 702 of O-DU 132 and a scheduler 704 of CMTS 126. Scheduler 702 is similar to mobile air interface resource scheduler 214 (FIG. 2). And scheduler 704 is similar to scheduler 218 (FIG. 2). Likewise, O-RU 130 and O-RU 116 are similar, and O-DU 118 and O-DU 132 are similar such that SDSABR engine 138 is also similar to SDSABR engine 122. The similarities in the midhaul and backhaul deployment scenarios are attributable to both SDSABR engines residing in an O-DU containerized network function, which is shown towards the left of the DOCSIS network. Hence, the SDSABR trigger messages traverse the complete DOCSIS network consisting of the CM and CMTS systems. In terms of differences, proper coordinated scheduling is desirable for each SDSABR engine to ensure delays incurred by DOCSIS network are mitigated by taking into account the path behavior between the O-DU and O-CU or O-DU+O-CU and the core network.

Figure 8:
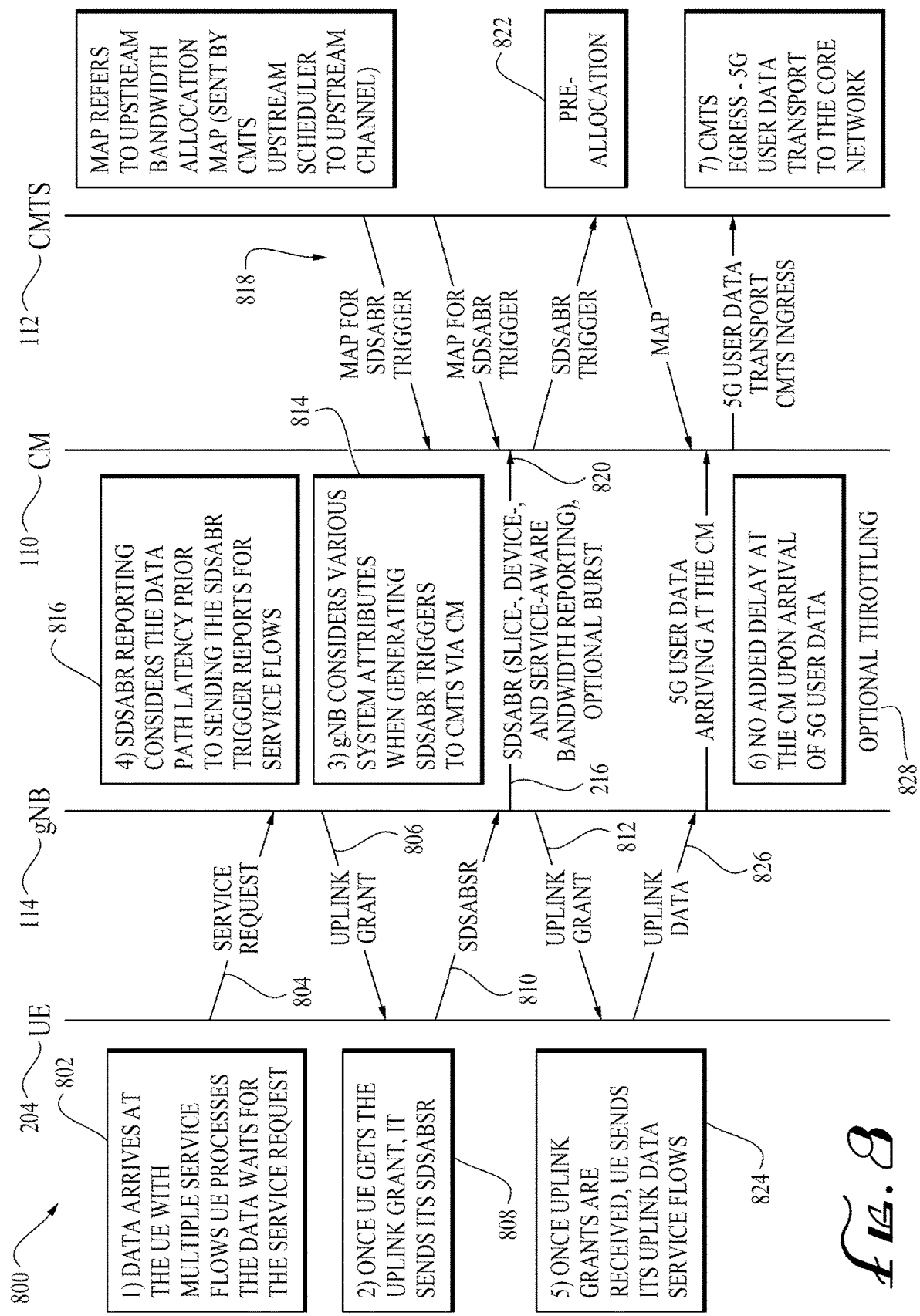
FIG. 8 is a message sequence diagram for the DOCSIS backhaul and midhaul transport systems shown in FIG. 2 and FIG. 7, respectively, in accordance with one embodiment.

FIG. 8 shows a diagram 800 of messages exchanged between first UE 204, DRAN integrated gNB 114, CM 110, and CMTS 112 for DOCSIS backhaul transport system 102 (e.g., FIG. 2). As noted with reference to FIG. 7, however, diagram 800 also applies to operation of CRAN gNB 128, CM 124, and CMTS 126 for DOCSIS midhaul transport system 104, i.e., since both scenarios include an O-DU (MAC) scheduler shown towards the left of a DOCSIS network.

Initially, first UE 204 receives 802 data with multiple service flows. First UE 204 processes the data and generates a service request 804 sent to DRAN integrated gNB 114. In response, DRAN integrated gNB 114 generates a first uplink grant 806 for first UE 204. Once first UE 204 receives 808 its first uplink grant 806, first UE 204 sends a slice-, device-, and service-aware buffer status report (SDSABSR) 810 indicating it is requesting a second uplink grant 812 for data transmission in the 5G wireless communication system.

SDSABSR 810 represents a BSR that is enhanced to include a RAN resource slice indicator, device category and priority indicators, and a service-flow indicator. For example, the RAN resource slice indicator is for actual physical resource blocks (spectrum) in FR1 (e.g., under 6 gHz bands) or FR2 (mmWave bands). In some embodiments, the RAN resource slice indicator also identifies a transport recourse that ties the radio to the DU (e.g., transport network binding DU to the RU, or the DU to the CU). In some embodiments, device category indicates a type of device such as, for example, smartphone, IoT device, industrial device, PDA, laptop, AR/VR modules, or other devices. Device priority indicates the priority from an access perspective. For example, the device priority may be low for a smart meter device or high priority for public safety equipment. Finally, a service flow indicator may indicate a 5Qi flow, quality of service, or other types of flow information described in 3GPP TS 23.501.

Next, DRAN integrated gNB 114 generates 814 a slice-, device-, and service-aware bandwidth reporting (SDSABR) trigger to CMTS 112 to allow it to make QoS and granting decisions in response to the SDSABR trigger and before receiving a data transmission. When it generates 814 the SDSABR trigger, DRAN integrated gNB 114 considers various system attributes, including those indicated in SDSABSR 810. These system attributes attributes are internal attributes, which control how the trigger is generated (e.g., based on available resources). In addition, the SDSABR engine of DRAN integrated gNB 114 considers 816 the data path latency prior to sending SDSABR trigger 216 for service flows. Data path latency is an external attribute. For instance, if the latency is higher than a certain threshold, the trigger can be suppressed, and it does not trigger the CM when DOCSIS networking is unavailable. In some embodiments, the latency is based on round trip time on the path associated with the request.

In FIG. 8, MAP 818 refers to the grant mechanism that is generated as a MAC management message at the CMTS-MAC layer and offered by CMTS 112 in response to a request message (not shown) sent by CM 110. This is referred to as the upstream bandwidth allocation (MAP) that has an entry such as an upstream service identity indicating a grant for CM 110. This grant is used by CM 110 for tagging to a service flow to send the upstream data arriving from O-DU 118 towards CMTS 112. CMTS scheduler 218 implementation impacts the request-grant mechanism within DOCSIS backhaul transport systems 102. In FIG. 8, the MAP lines temporally preceding SDSABR trigger lines refer to the request-grant exchange that happens between CM 110 and CMTS 112 upon power up so that CMTS 112 is aware of all its subtending CMs ready to serve upstream data transfer.

Once SDSABR trigger 216 is generated, it is reported 820 from DRAN integrated gNB 114 to CM 110 and CMTS 112. Transmission resources are then pre-allocated 822 for first UE 204 to transmit 824 uplink data 826. Uplink data 826 is then provided to CM 110 and CMTS 112.

With respect to intelligent allocation 822 of resources, there are various implementations that are possible. For instance, CMTS 112 may first review the access priority. If the trigger is for a public safety device, for example, then CMTS 112 may reserve certain resources, so the public safety receives priority access compared to other lower-priority requests. Next, CMTS 112 may then check the device category compared to other requests. It then allocates resources for certain devices so that they are served before other less important devices. Next, CMTS 112 checks the service flow so that certain flows receive resources before other flows. And finally, CMTS 112 checks the slice ID so that certain slices receive resources before other slices. These checks may be made seriatim. In other embodiments, certain checks may be performed in parallel. CMTS 112 is thereby able to make QoS and resource granting decisions relative other requests from other devices in response to SDSABR trigger 216 and before receiving the data transmission. The other request may be from non-3GPP access technology (non-5G technology, as well).

FIG. 8 also shows an optional throttling 828 capability, in which the SDSABR reporting mechanism has additional intelligence to throttle the rate at which it initiates the triggers based on the arrival of the UE requests and aggregate number of flows to ensure that such triggers do not saturate CMTS scheduler 218. Such a throttling mechanism could rely upon the network intelligence provided by the O-RAN orchestrator via O-RAN management layer 220 interface or via the NearRT RIC via the E2 interface using an API based model.

The throttling methods could also be used to offload SDSABR triggers and steer certain traffic via a neighboring or a co-located DU (see e.g., FIG. 12) or transport method (such as the use of dark fiber in case the DU also has a direct fiber termination in addition to its DOCSIS transport for failover towards the centralized CU network function). For example, if the CPU utilization of the MAC O-DU is high, then throttling is employed to limit rate of triggers.

Multiple triggers originating from a single end point or a group of end points within a certain grid area could be selectively bundled into a single trigger to minimize unnecessary overhead at the transport layer and thus provide a unified latency experience. For example, if there are multiple requests coming from two unique user identities in the same location for the same type of service flows, they could be bundled and sent together as two unique triggers for each user identity and could be prioritized based on an intelligent learning mechanism. Such methods could employ AI based rules and/or policy engine that can provide direct feedback about the end point, based on its subscription information retrieved from the network, to the SDSABR triggering engine via the management interface. There could be other systemic considerations such as the UE category, complexity, priority, identity, power savings mode, deep sleep cycles, or other considerations that can be used to drive proactive triggers to ensure the desired service behaviors are guaranteed when adopting selective throttling.

Figure 9:
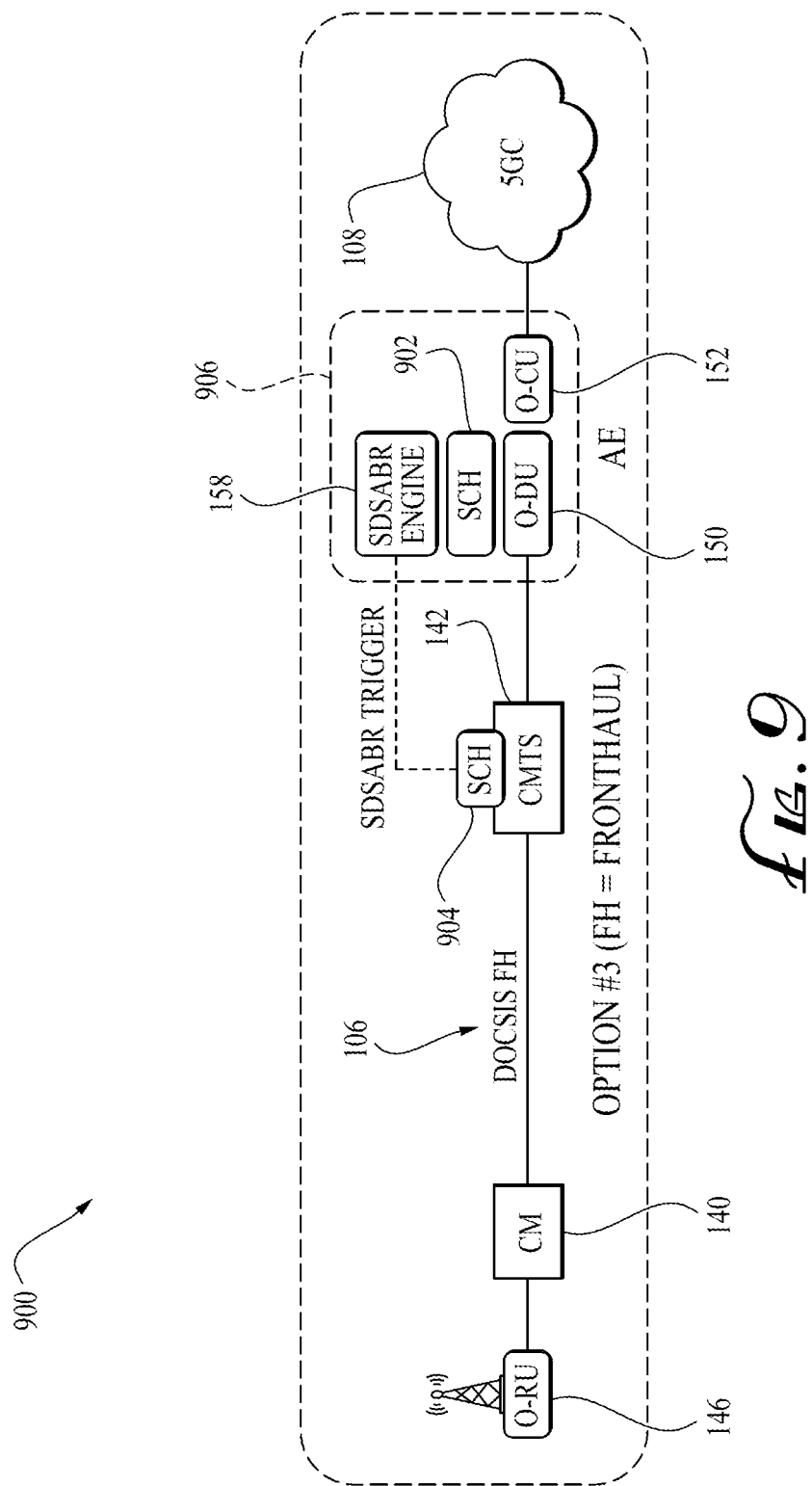
FIG. 9 is a network diagram showing a DOCSIS fronthaul transport system, in accordance with one embodiment.

FIG. 9 shows DOCSIS fronthaul transport system 106 in greater detail. Specifically, FIG. 9 shows a scheduler 902 of O-DU 150 and a scheduler 904 of CMTS 142. An AE 906 includes O-DU 150 and O-CU 152.

Figure 10A:
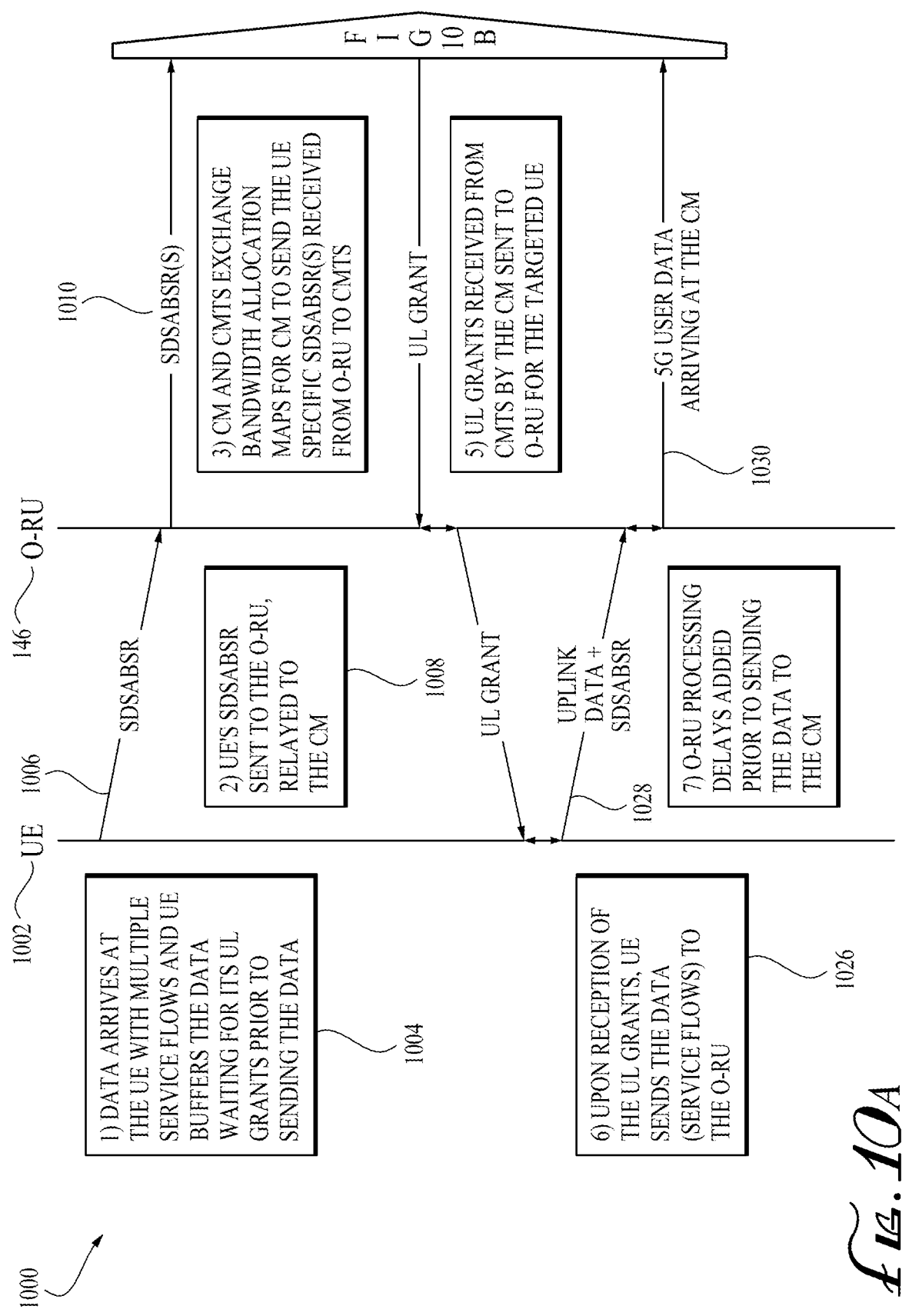

FIG. 10A and FIG. 10B show a diagram 1000 of messages exchanged between a UE 1002, O-RU 146, CM 140, CMTS 142, and O-DU 150/O-CU 152 for DOCSIS fronthaul transport system 106 (e.g., FIG. 9). In this scenario, SDSABR reporting does not traverse the DOCSIS transport network as O-DU MAC scheduler 902 is towards the right of the DOCSIS network.

While the O-RAN mobile standards support multiple split options—e.g., Option 2, higher-layer split (HLS) and Option 6 or 7 (see 3GPP TR 38.801 section 11), lower-layer split (LLS)— within the gNB, multi-vendor interoperability becomes extremely important to ensure the interfaces between the gNB work appropriately. These options refer to how an O-RU connects to an O-DU and where the partitioning happens in the modem transmission path. In case of Option 2 HLS, the SDSABR reporting will work as in the case of backhaul deployments with reporting exchanged across the DOCSIS transport. In case of Option 7-2 LLS split, the O-DU logical node implements the RLC/MAC/High-PHY layers with the SDSABR engine riding on top of the MAC layer. The SDSABR reporting will not traverse the DOCSIS network as the O-DU MAC scheduler resides northbound to the CMTS. For any mobility or handover scenarios between the 5G gNBs, the Xn signaling exchange happens between the O-DUs and does not traverse the DOCSIS network. However, the O-DU sends the SDSABR reporting UL grants besides other scheduling and beamforming information to the O-RU in the form of control plane messaging for every 5G slot. The O-DU and O-RU exchange control, management, and user data on the fronthaul interface. O-DU 150 sends control and user plane data for every timeslot to O-RU 146 via DOCSIS fronthaul transport system 106. O-DU 150 also sends the control plane messages and commands to O-RU 146 for timeslot information.

Initially, UE 1002 receives 1004 data with multiple service flows. UE 1002 buffers the data while waiting for UL grans. It sends an SDSABSR 1006 to O-RU 146. O-RU 146 then relays 1008 SDSABSR(s) 1010 to CM 140. CM 140 and CMTS 142 exchange MAP 1012 messages to allocate bandwidth. This allocates bandwidth for CM 140 to send UE-specific SDSABSR 1014 to CMTS 142.

CMTS 142 next provides SDSABSR(s) 1016 to O-DU 150. In response, a MAC schedule of O-DU 150 provides 1018 UL grants 1020 and an SDSABR trigger 1022. As described previously with reference to FIG. 8, CMTS 142 is thereby able to make QoS and resource granting decisions relative other requests from other devices in response to SDSABR trigger 1022 and before receiving the data transmission.

The data path connectivity between O-DU 150 and CMTS 142 can be sensitive to the latency depending on the deployment scenarios associated with a dedicated CMTS model vs shared CMTS model. Since a single O-DU (e.g., O-DU 150, FIG. 1) can control one or more O-RUs, which could be connected via the DOCSIS-CM and CMTS in a meshed connection, SDSABR reporting/mapping and reporting of UL grants in the fronthaul on a targeted UE becomes important. In some embodiments, SDSABR trigger 1022 includes UL grant 1020. In other embodiments, SDSABR trigger 1022 includes a data path latency summary.

As described previously with reference to FIG. 8, the throttling methods could also be used to offload SDSABR triggers 1022 and steer certain traffic via a neighboring or a co-located DU (see e.g., FIG. 12) or transport method (such as the use of dark fiber in case the DU also has a direct fiber termination in addition to its DOCSIS transport for failover towards the centralized CU network function). For example, if the CPU utilization of the MAC O-DU is high, then throttling is employed to limit rate of triggers.

In some embodiments, the SDSABR engine in O-DU 150 may receive SDSABSR from multiple devices. Accordingly, it may concatenate them for a single SDSABR trigger 1022.

As explained previously with reference to FIG. 8, CMTS 142 provides for intelligent resource allocation in response to SDSABSR 1014.

FIG. 10B shows that CMTS 142 receives a UL grant 1024, which is eventually sent to CM 140, O-RU 146, and UE 1002 in FIG. 10A. In response, UE 1002 transmits 1026 its data 1028 (service flows) to O-RU 146.

Upon reception of UL UE data 1028 in symbols of the associated timeslot, O-RU 146 sends 1030 to CM 140 control and user plane data for that timeslot. Without pre-allocation of bandwidth, CM 140 would potentially buffer data 1028 until the UL grants are received from CMTS 142. In order to minimize the buffering at CM 140 and avoid processing/storage complexity associated with multiple service flows at the individual UE level, CMTS 142 has already provided the UL grants to each of its serving CMs. Accordingly, the SDSABR reporting by O-DU MAC scheduler 902 (FIG. 9) is used by CMTS 142 to provide the UL grants based on the SDSABR trigger 1022 messaging received on a slot-by-slot basis. Once CMTS 142 provides the grants, CM 140 can transport 1032 the control and user plane data to CMTS 142 without additional processing delays. As soon as CMTS 142 receives the UL data from CM 140, it sends it to O-DU 150 without any added delays. A closed-loop path monitoring and coordination between CMTS 142 and scheduler 902 with enhanced SDSABR reporting capability mitigates unnecessary delays as well as efficiently processes grant allocations in a fronthaul deployment scenario.

Figure 11:
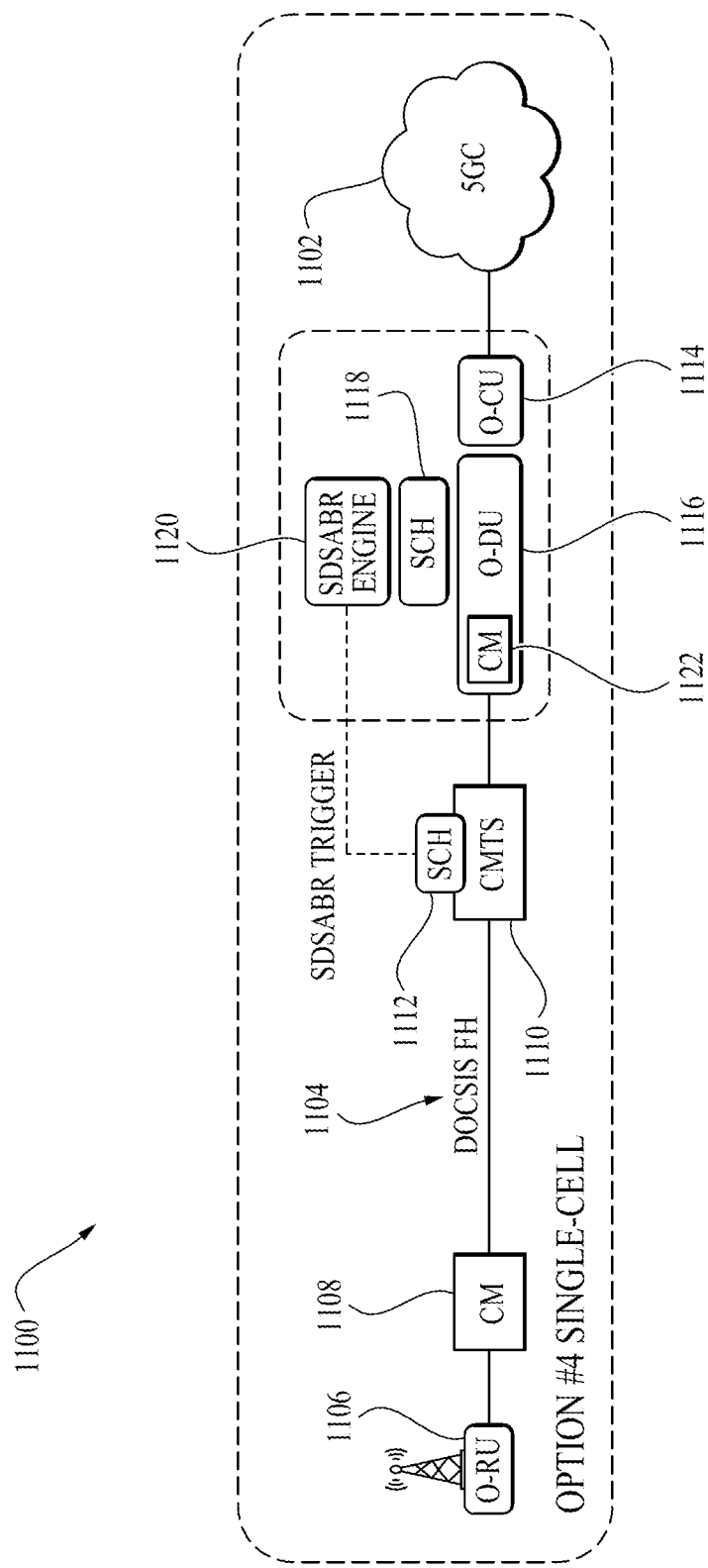
FIG. 11 is a network diagram showing a DOCSIS fronthaul transport system with a shared CMTS in a single cell deployment, in accordance with one embodiment.

FIG. 11 shows an example of a shared CMTS deployment model in which a 5G and DOCSIS network 1100 includes a single cell connected to 5G core network 1102 via a DOCSIS fronthaul transport system 1104. In this configuration, an O-RU 1106, CM 1108, CMTS 1110, its scheduler 1112, and O-CU 1114 are substantially similar to the corresponding components shown in FIG. 9. An O-DU 1116, which implements a scheduler 1118 and an SDSABR engine 1120, also includes a CM interface 1122.

In FIG. 11, O-DU 1116 is front-ended by a low-cost version of CM interface 1122, which simplifies connectivity towards a shared CMTS 1110 compared to that shown in FIG. 9 where there is a direct transport connectivity between CMTS 142 and O-DU 150. In limited CMTS deployments, resource sharing is achieved by having a simplified CM-CMTS transport connection at the O-DU rather than having a fiber connection that could be much longer depending on the geographic location. This is similar to an integrated O-DU and CM that could be used as a direct connection towards the CMTS.

Figure 12:
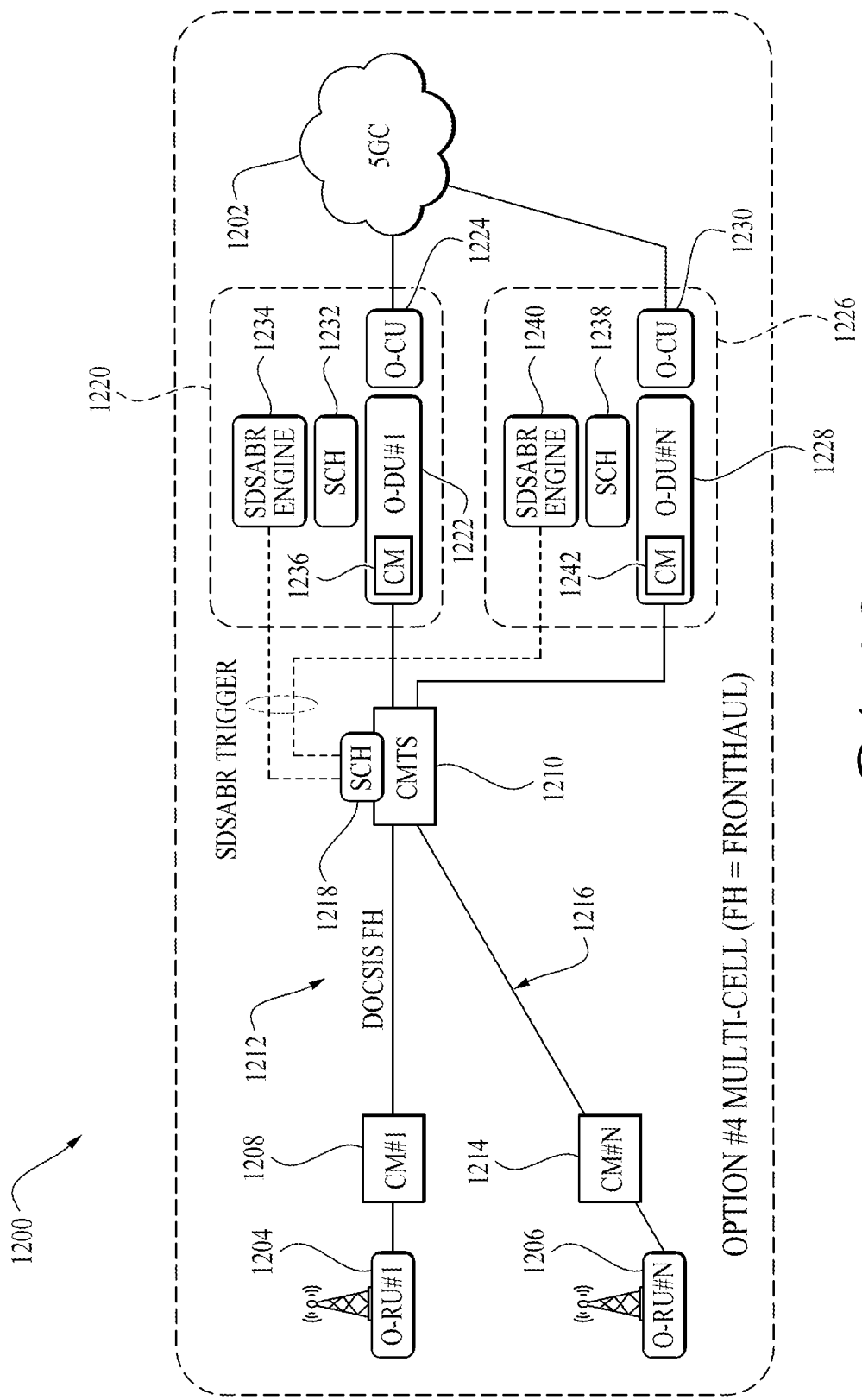
FIG. 12 is a network diagram showing a DOCSIS fronthaul transport system with a shared CMTS in a multiple cell deployment having multiple O-DUs, in accordance with one embodiment.

FIG. 12 shows another example of a shared CMTS deployment model in which a and DOCSIS network 1200 includes multiple cells connected to 5G core network 1202. The multiple cells are provided by an O-RU 1204 and an O-RU 1206. A CM 1208 and a CMTS 1210 provide a DOCSIS fronthaul transport system 1212 for O-RU 1204. A CM 1214 and CMTS 1210 provide a DOCSIS fronthaul transport system 1216 for O-RU 1206. Thus, CMTS 1210 is a shared resource.

CMTS 1210 also has a scheduler 1218 for multiple AEs. An AE 1220 includes an 1222 and an O-CU 1224. An AE 1226 includes an O-DU 1228 and an O-CU 1230.

Each O-DU is similar to that shown in FIG. 11. For example, O-DU 1222 implements a scheduler 1232, an SDSABR engine 1234, and a CM interface 1236. O-DU 1228 implements a scheduler 1238, an SDSABR engine 1240, and a CM interface 1242.

Figure 13:
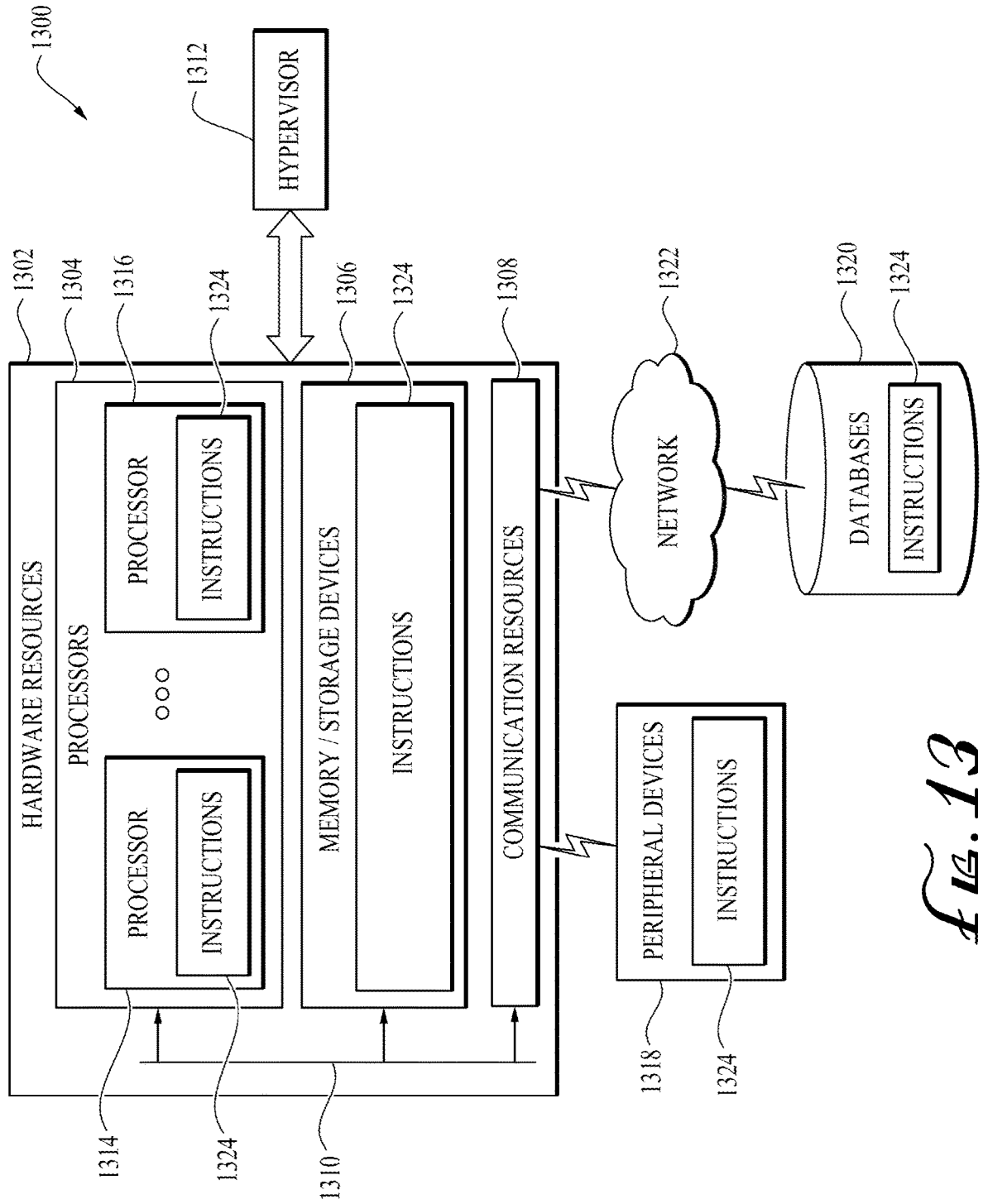
FIG. 13 is a block diagram showing components of an O-DU or CMTS, in accordance with one embodiment.

FIG. 13 is a block diagram illustrating components 1300 of an O-DU or CMTS, according to some example embodiments, able to read instructions from a machine-readable or computer-readable medium (e.g., a non-transitory machine-readable storage medium) and perform any one or more of SDSABR engine tasks (e.g., generate SDSABR triggers, FIG. 14) discussed herein. Specifically, FIG. 13 shows a diagrammatic representation of hardware resources 1302 including one or more processors 1304 (or processor cores), one or more memory/storage devices 1306, and one or more communication resources 1308, each of which may be communicatively coupled via a bus 1310. For embodiments where node virtualization (e.g., NFV) is utilized, a hypervisor 1312 may be executed to provide an execution environment for one or more network slices/sub-slices to utilize the hardware resources 1302.

Processors 1304 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1314 and a processor 1316.

Memory/storage devices 1306 may include main memory, disk storage, or any suitable combination thereof. Memory/storage devices 1306 may include, but are not limited to any type of volatile or non-volatile memory such as dynamic random-access memory (DRAM), static random-access memory (SRAM), erasable programmable read-only memory (EPROM), electrically erasable programmable read-only memory (EEPROM), Flash memory, solid-state storage, etc.

Communication resources 1308 may include interconnection or network interface components or other suitable devices to communicate with one or more peripheral devices 1318 or one or more databases 1320 via a network 1322. For example, communication resources 1308 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1324 may comprise software, a program, an application, an applet, an app, or other executable code for causing at least any of processors 1304 to perform any one or more of SDSABR engine tasks discussed herein. Instructions 1324 may reside, completely or partially, within at least one of processors 1304 (e.g., within the processor's cache memory), memory/storage devices 1306, or any suitable combination thereof. Furthermore, any portion of instructions 1324 may be transferred to hardware resources 1302 from any combination of peripheral devices 1318 or databases 1320. Accordingly, memory of the processors 1304, memory/storage devices 1306, peripheral devices 1318, and databases 1320 are examples of computer-readable and machine-readable media.

Figure 14:
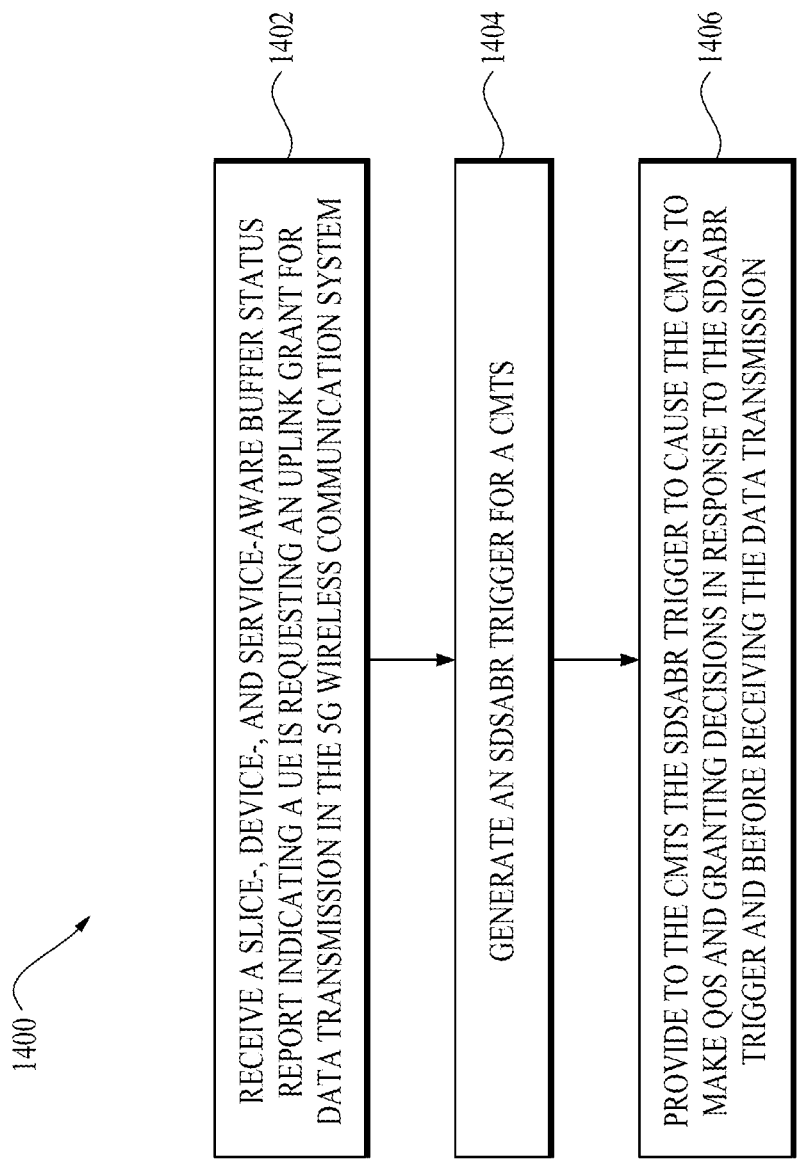
FIG. 14 is a flow chart of a process for pipelined 5G and DOCSIS latency, in accordance with one embodiment.

FIG. 14 shows a process 1400, performed by an O-DU configured to facilitate, in a wireless communication system having a DOCSIS xhaul transport system, for pipelined and DOCSIS latency.

In a block 1402, process 1400 receive a slice-, device-, and service-aware buffer status report (SDSABSR) indicating a UE is requesting an uplink grant for data transmission in the 5G wireless communication system. The SDSABSR includes a RAN resource slice indicator, device category and priority indicators, and a service flow indicator.

In a block 1404, process 1400 generates, based on the SDSABSR, a slice-, device-, and service-aware bandwidth reporting (SDSABR) trigger for a CMTS. As described previously, the generation of the trigger is based on internal and external attributes.

In a block 1406, process 1400 provides to the CMTS the SDSABR trigger to cause the CMTS to make QoS and resource granting decisions relative other requests from other devices in response to the SDSABR trigger and before receiving the data transmission.

Process 1400 may also include reporting SDSABR information grant request and grant access to an O-RAN management layer for real-time network performance monitoring. Process 1400 may also include the SDSABR trigger indicating a device type as one of a smartphone, an IoT device, an industrial device, a PDA, a laptop, or an AR/VR module. Process 1400 may also include the SDSABR trigger indicating a radio access technology type. Process 1400 may also include the SDSABR trigger indicating a device priority as having low- or high-priority or emergency access. Process 1400 may also include the SDSABR trigger indicating a service flow ID. Process 1400 may also include the SDSABR trigger indicating a number of service flows. Process 1400 may also include the SDSABSR received through a DOCSIS backhaul. Process 1400 may also include the SDSABSR received through a DOCSIS midhaul. Process 1400 may also include the SDSABSR received through a DOCSIS fronthaul. Process 1400 may also include the SDSABR trigger indicating a burst SDSABR trigger concatenated for multiple devices.

Skilled persons will appreciate that many changes may be made to the details of the above-described embodiments without departing from the underlying principles of the invention. The scope of the present invention should, therefore, be determined only by the following claims.

What is claimed is:

1. A non-transitory computer-readable storage medium of an O-DU configured to facilitate, in a 5G wireless communication system having a DOCSIS xhaul transport system, pipelined and DOCSIS latency, the computer-readable storage medium including instructions that when executed by the O-DU, cause it to:

receive a slice-, device-, and service-aware buffer status report (SDSABSR) indicating a UE is requesting an uplink grant for data transmission in the 5G wireless communication system, the SDSABSR including a RAN resource slice indicator, device category and priority indicators, and a service flow indicator;

generate, based on the SDSABSR, a slice-, device-, and service-aware bandwidth reporting (SDSABR) trigger for a CMTS; and provide to the CMTS the SDSABR trigger to cause the CMTS to make QoS and resource granting decisions relative other requests from other devices in response to the SDSABR trigger and before receiving the data transmission.

2. The non-transitory computer-readable storage medium of claim 1, in which the instructions further configure the O-DU to report SDSABR information grant request and grant access to an O-RAN management layer for real-time network performance monitoring.

3. The non-transitory computer-readable storage medium of claim 1, in which the SDSABR trigger indicates a device type as one of a smartphone, an IoT device, an industrial device, a PDA, a laptop, or an AR/VR module.

4. The non-transitory computer-readable storage medium of claim 1, in which the SDSABR trigger indicates a radio access technology type.

5. The non-transitory computer-readable storage medium of claim 1, in which the SDSABR trigger indicates a device priority as having low- or high-priority or emergency access.

6. The non-transitory computer-readable storage medium of claim 1, in which the SDSABR trigger indicates a service flow ID.

7. The non-transitory computer-readable storage medium of claim 1, in which the SDSABR trigger indicates a number of service flows.

8. The non-transitory computer-readable storage medium of claim 1, in which the SDSABSR is received through a DOCSIS backhaul.

9. The non-transitory computer-readable storage medium of claim 1, in which the SDSABSR is received through a DOCSIS midhaul.

10. The non-transitory computer-readable storage medium of claim 1, in which the SDSABSR is received through a DOCSIS fronthaul.

11. The non-transitory computer-readable storage medium of claim 1, in which the SDSABR trigger indicates a burst SDSABR trigger concatenated for multiple devices.

12. A method, performed by an O-DU configured to facilitate, in a 5G wireless communication system having a DOCSIS xhaul transport system, for pipelined 5G and DOCSIS latency, the method comprising:

receiving a slice-, device-, and service-aware buffer status report (SDSABSR) indicating a UE is requesting an uplink grant for data transmission in the 5G wireless communication system, the SDSABSR including a RAN resource slice indicator, device category and priority indicators, and a service flow indicator;

generating, based on the SDSABSR, a slice-, device-, and service-aware bandwidth reporting (SDSABR) trigger for a CMTS; and provide to the CMTS the SDSABR trigger to cause the CMTS to make QoS and resource granting decisions relative other requests from other devices in response to the SDSABR trigger and before receiving the data transmission.

13. The method of claim 12, further comprising reporting SDSABR information grant request and grant access to an O-RAN management layer for real-time network performance monitoring.

14. The method of claim 12, in which the SDSABR trigger indicates a device type as one of a smartphone, an IoT device, an industrial device, a PDA, a laptop, or an AR/VR module.

15. The method of claim 12, in which the SDSABR trigger indicates a radio access technology type.

16. The method of claim 12, in which the SDSABR trigger indicates a device priority as having low- or high-priority or emergency access.

17. The method of claim 12, in which the SDSABR trigger indicates a service flow ID.

18. The method of claim 12, in which the SDSABR trigger indicates a number of service flows.

19. The method of claim 12, in which the SDSABSR is received through a DOCSIS backhaul.

20. The method of claim 12, in which the SDSABSR is received through a DOCSIS midhaul.

21. The method of claim 12, in which the SDSABSR is received through a DOCSIS fronthaul.

22. The method of claim 12, in which the SDSABR trigger indicates a burst SDSABR trigger concatenated for multiple devices.

* * * * *